United States Patent
Hickman et al.

(10) Patent No.: US 11,097,186 B1
(45) Date of Patent: Aug. 24, 2021

(54) GUIDE-ASSISTED VIRTUAL EXPERIENCES

(71) Applicant: VR Exit LLC, Fort Lauderdale, FL (US)

(72) Inventors: Curtis Hickman, Pleasant Grove, UT (US); Farrell Edwards, Lindon, UT (US)

(73) Assignee: VR Exit LLC, Fort Lauderdale, FL (US)

( * ) Notice: Subject to any disclaimer, the term of this patent is extended or adjusted under 35 U.S.C. 154(b) by 0 days.

(21) Appl. No.: 16/523,898

(22) Filed: Jul. 26, 2019

(51) Int. Cl.
*A63F 13/25* (2014.01)
*G06T 19/00* (2011.01)
*A63F 13/212* (2014.01)
*G06F 3/01* (2006.01)

(52) U.S. Cl.
CPC ............ *A63F 13/25* (2014.09); *A63F 13/212* (2014.09); *G06F 3/011* (2013.01); *G06T 19/003* (2013.01); *G06T 19/006* (2013.01)

(58) Field of Classification Search
None
See application file for complete search history.

(56) References Cited

U.S. PATENT DOCUMENTS

| 2005/0009608 A1* | 1/2005 | Robarts ................ A63F 13/355 463/42 |
| 2012/0094768 A1* | 4/2012 | McCaddon ........... G06F 3/0482 463/42 |

* cited by examiner

*Primary Examiner* — Ronald Laneau
(74) *Attorney, Agent, or Firm* — Sunstein LLP

(57) ABSTRACT

Described herein are techniques for providing guide-assisted virtual experiences. A virtual experience operator provides participants with the opportunity to engage in virtual experiences at physical locations managed by the operator. These physical locations enable participants to engage with any of a variety of virtual realities provide by the operator—for example, participants may find them themselves in a virtual reality ghost-hunting mission, as a team of fictional soldiers on a mission to retrieve important cargo in outer space, in a horror-type experience at a deserted world's fair, within a number of arcade games, among other possible types of virtual experiences. Participants' engagement with such virtual experiences can be enhanced with the use of human "guides." These guides represent employees or other affiliates of a virtual experience operator trained to help guide participant teams through some or all of a virtual experience and related phases at a virtual experience location.

30 Claims, 23 Drawing Sheets

GUIDE-ASSISTED VIRTUAL EXPERIENCES

BACKGROUND

The market for virtual reality experiences has increased dramatically in recent years. Virtual reality experience systems allow users to explore virtual spaces. Some virtual reality experience systems rely on head-mounted displays (HMDs) worn by participants and through which the participants visually experience a virtual experience environment.

BRIEF DESCRIPTION OF DRAWINGS

Various embodiments in accordance with the present disclosure will be described with reference to the drawings, in which.

DETAILED DESCRIPTION

Figure 1:
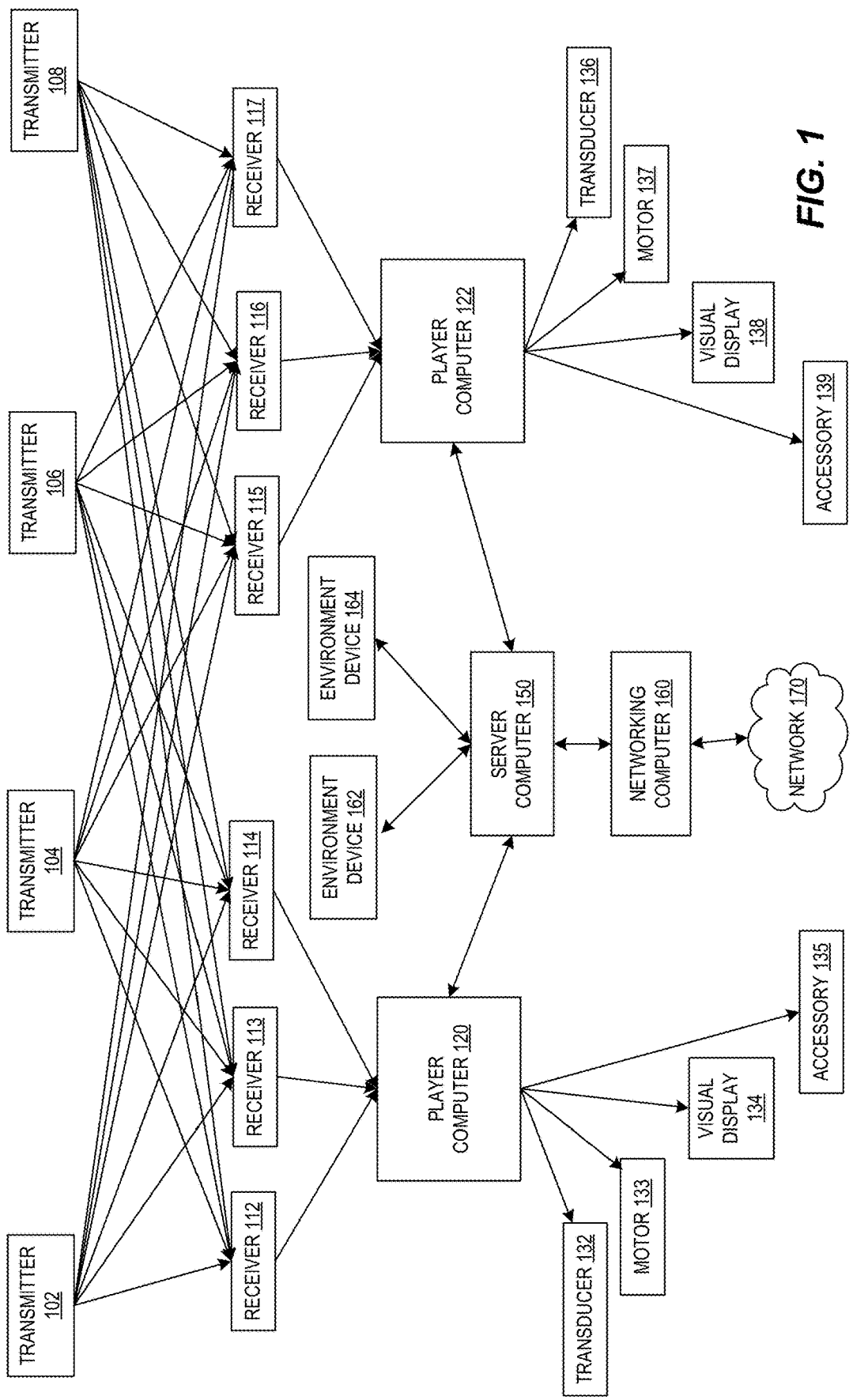
FIG. 1 is a block diagram illustrating an exemplary system for providing a virtual experience.

The present disclosure relates to methods, apparatus, systems, and non-transitory computer-readable storage media for providing guide-assisted virtual experiences. According to some embodiments, a virtual experience operator generally provides participants with the opportunity to engage in virtual experiences at one or more physical locations managed by the operator (e.g., where the participants may pay for admission to virtual experiences or otherwise be granted access to engage in virtual experiences). These physical locations generally enable participants to engage with any of a variety of virtual realities provide by the operator—for example, participants may find them themselves in a virtual reality ghost-hunting mission, as a team of fictional soldiers on a mission to retrieve important cargo in outer space, in a horror-type experience at a deserted world's fair, within a number of arcade games, among other possible types of virtual experiences.

Once a participant is ready to engage in a virtual experience at one of these locations, the operator provides participants with head-mounted displays (HMDs) with motion tracking, among other possible equipment. The participants' equipment and the physical location itself further include various haptic feedback and other special effects systems that allow participants to freely explore and interact with virtual settings within the confines of specially-designed physical environments at the operator-managed locations. These specially-designed physical environments, sometimes referred to as "stages," may further comprise a variety of physical elements including, for example, ceiling-mounted motion tracking cameras to read participants' movements, foam walls, fans, mist machines, heat lamps, and props representing items such as guns and torches. Many of these physical elements correspond to elements within a virtual world seen by the participants through their HMDs, thereby increasing the illusion of immersion.

As indicated above, a virtual experience operator may operate any number of separate physical locations (e.g., located in different cities or countries) at which participants can purchase tickets for or otherwise gain access to various virtual experiences created by the operator. Participants may typically engage with such experiences in limited-size groups (e.g., groups of approximately 1-4 people, although the groups can be of any size depending on the implementation) and access a designated experience either at a scheduled time or when space becomes available. In addition to the virtual experience itself, the end-to-end participant experience at a virtual experience location may include several phases including a lobby area where participants check-in for a particular virtual experience, a briefing room phase where participants are given preparatory information about the virtual experience they are to experience, a suit-up phase where participants are provided with the necessary equipment, a pre-launch phase where any equipment issues are troubleshooted and the participants are launched into a virtual experience, and so forth.

According to embodiments described herein, the way in which participants engage with virtual experiences at physical locations as described above is enhanced with the use of human "guides." These guides generally represent employees or other affiliates of a virtual experience operator that are trained to help guide participant teams through some or all of a virtual experience and related phases at a virtual experience location. Currently, the staff at virtual experience locations often remain stationary at various areas throughout the location to assist with any issues that may arise but otherwise are not directly involved in the participants' experiences. As described herein, a guide-assisted experience instead involves the assignment of one or more guides to each group of participants. An assigned guide remains with a participant group for all or substantially all of the group's experience (e.g., during virtual experience briefings, suit-up processes, throughout the actual virtual experience, during suit-down processes, and so forth).

In some embodiments, a virtual experience guide uses one or more portable computing devices (e.g., a tablet computer, a mobile device, or the like) to provide the guide with relevant tools at the right moments during virtual experiences. Among other benefits described herein, the guide experience improves participant experience by making it more efficient, smoother, and more personal. For example, a same guide can help participants suit-up and troubleshoot any operational issues, verbally communicate with participants during an experience to help users with issues or to further immerse the participants in the experience, physically interact with participants during experiences (e.g., by handing participants objects within the environment, directing participants gaze to relevant portions of an experience, or other engage in other performative actions), monitor the progress of the guide's assigned team and other teams at the same location, among other possible actions.

FIG. 1 is a block diagram illustrating a system for providing a virtual environment and experience according to some embodiments. The system of FIG. 1 includes transmitters 102, 104, 106 and 108, receivers 112, 113, 114, 115, 116 and 117, player (or participant) computers 120 and 122, transducers 132 and 136, motors 133 and 137, visual displays 134 and 138, accessories 135 and 139, server computer 150, environment devices 162 and 164, networking computer 160, and network 170.

Receivers 112-117 may be placed on a player or an accessory 135. Each receiver may receive one or more signals from one or more of transmitters 102-108. The signals received from each transmitter may include an identifier to identify the particular transmitter. In some instances, each transmitter may transmit an omnidirectional signal periodically at the same point in time. Each receiver may receive signals from multiple transmitters, and each receiver may then provide signal identification information and timestamp information for each received signal to player computer 120. By determining when each transmitter signal is received from a receiver, player computer 120 may identify the location of each receiver.

Player computer 120 may be positioned on a player, such as for example on the back of a vest worn by a player. For example, with respect to FIG. 2, player computer 150 is positioned on a back of a player 200. A player computer may receive information from a plurality of receivers, determine the location of each receiver, and then locally update a virtual environment accordingly. Updates to the virtual environment may include a player's point of view in the environment, events that occur in the environment, and video and audio output to provide to a player representing the player's point of view in the environment along with the events that occur in the environment.

Player computer 120 may also communicate changes to the virtual environment determined locally at the computer to other player computers, such as player computer 122, through server computer 150. In particular, a player computer for a first player may detect a change in the player's position based on receivers on the player's body, determine changes to the virtual environment for that player, provide those changes to server computer 150, and server computer 150 will provide those updates to any other player computers for other players in the same virtual experience session, such as a player associated player computer 122.

A player, or participant, may have multiple receivers on his or her body. Each body-worn receiver receives information from one or more transmitter and provides that information to the player computer and/or server computer 150. In some instances, each receiver may provide the data to the player computer wirelessly, such as for example through a radiofrequency signal such as a Bluetooth® signal. In some instances, each receive may be paired or otherwise configured to only communicate data with a particular player computer. In some instances, a particular player computer may be configured to only receive data from a particular set of receivers. Based on physical environment events such as a player walking, local virtual events that are provided by the player computer, or remote virtual events triggered by an element of the virtual environment located remotely from the player, player haptic feedback may be triggered and sensed. The haptic feedback may be provided in the terms of transducer 132 and/or motor 133. For example, if an animal or object touches a player at a particular location on the player's body within the virtual environment, a transducer located at that position may be activated to provide a haptic sensation of being touched by that object. Note that transducers in an environmental device may also provide haptic feedback.

Visual display 134 may be provided through a headset worn by a participant. The visual display 134 may include a helmet, visual display, and other elements and components needed to provide a visual and audio output to a participant. In some instances, player computer 120 may generate and provide virtual environment graphics to a player through the visual display 134.

Accessory 135 may be an element separate from the player, in communication with player computer 120, and displayed within the virtual environment through visual display 134. For example, an accessory may include a gun, a torch, a light saber, a wand, or any other object that can be graphically displayed within the virtual environment and physically engaged or interacted with by a participant. Accessories 135 may be held by a participant, touched by a participant, or otherwise engaged in a physical environment and represented within the virtual environment by player computer 120 through visual display 134.

Server computer 150 may communicate with player computers 120 and 122 to receive updated virtual information from the player computers and provide that information to other player computers currently active in the virtual experience session. Server computer 150 may store and execute a virtual experience engine, such as Unity game engine, Leap Motion, Unreal game engine, or another virtual experience engine. Server computer 150 may also provide virtual environment data to networking computer 160 and ultimately to other remote locations through network 170.

Environment devices 162 and 164 may include physical devices that are a part of the physical environment that may interact or be detected by a participant or other aspects of the gaming system. For example, an environment device 162 may be a source of heat, cold, wind, sound, smell, vibration (such as provided by one or more transducers in the floor, for example), or some other sense that may be detected by a participant.

Figure 2:
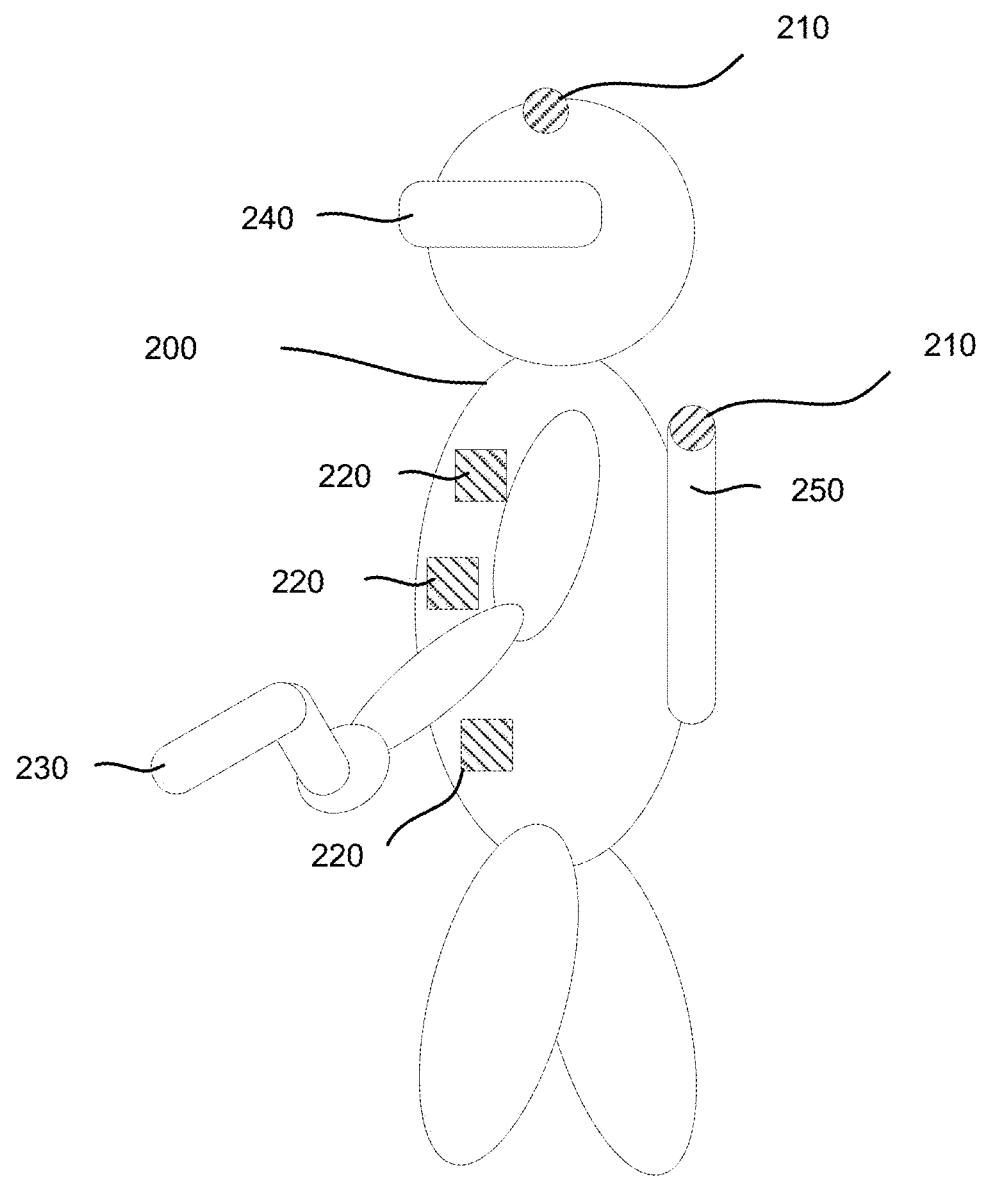
FIG. 2 is a block diagram illustrating a participant of a virtual experience according to some embodiments.

FIG. 2 is a block diagram of a player 200, also referred to herein as a participant, according to some embodiments. Player 200 may include one or more receivers 210, a plurality of haptic devices 220, one or more accessories 230, visual display 240, and player computer 250. As shown, one or more receivers 220 may be placed in multiple locations over a player's body. In some instances, receivers are placed on clothing that may be worn or attached to the player such as a vest housing the player computer 250. As a virtual session is experienced by the player, the location of each receiver will be determined by player computer 250 based on signal ID information and timestamp information received by each and every receiver by the player computer 250. Based on physical environment events, local virtual events, and remote virtual vents, haptic feedback may be provided to a player through one or more haptic devices 220. Each haptic device 220 may include one or more transducers or motors positioned on the clothing or otherwise attached to a player in such a way as to provide haptic feedback that can be sensed by the player. Accessory 230 may be held by a player and may also include one or more receivers and haptic devices, each of which may have a similar functionality as those placed on a player's body. A heads-up display unit 240 provides a player with graphic display, textual information, audio information, and other information for a virtual session as provided by player computer.

Figure 3:
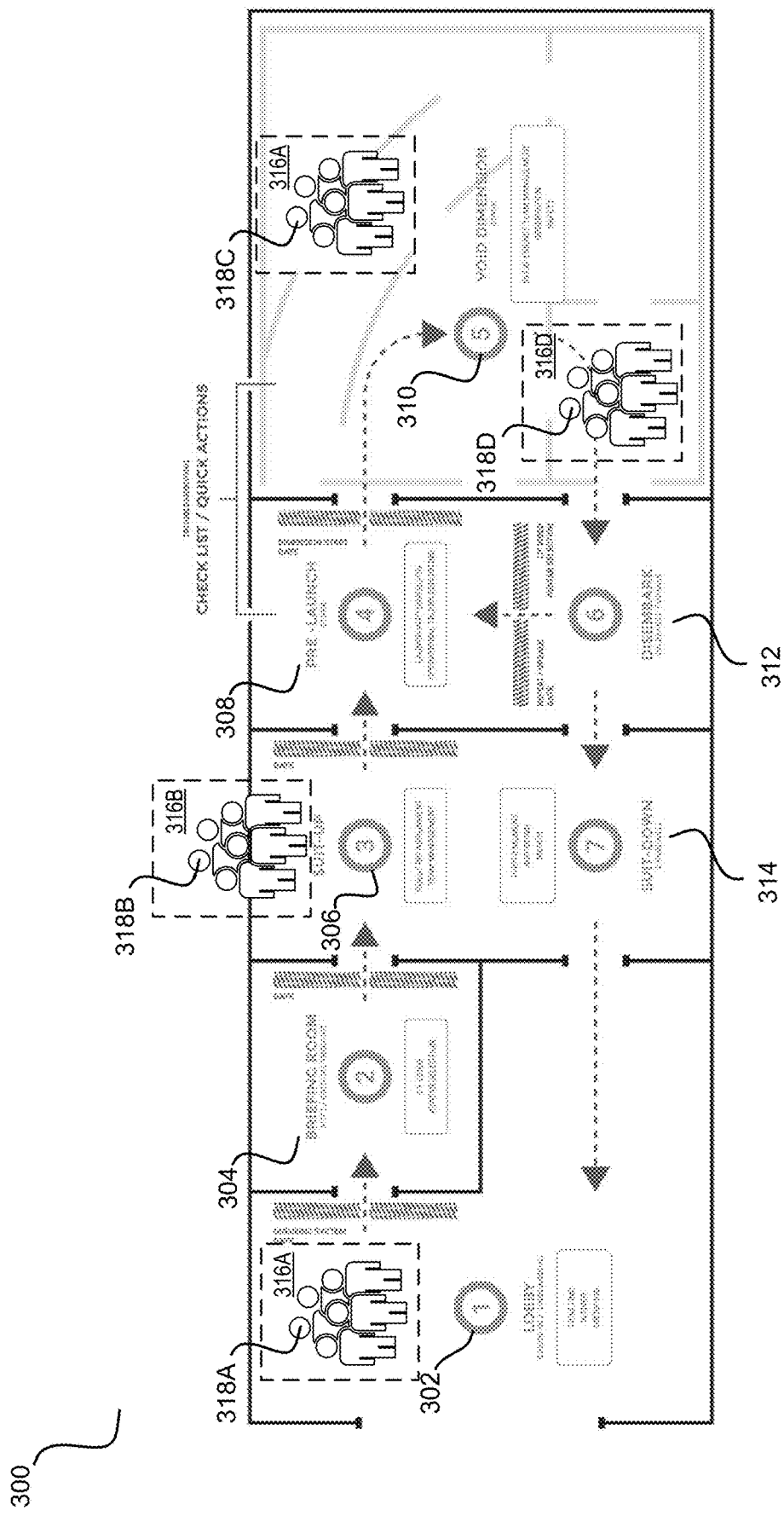
FIG. 3 is a diagram illustrating a physical environment for a virtual experience and an end-to-end progression of participants through the experience according to some embodiments.

FIG. 3 is a diagram illustrating a physical environment for a virtual experience including guides according to some embodiments. As shown in FIG. 3, groups of participants 316A-316D, each including some number of individual experience participants, progress through a virtual experience in several distinct phases with respective guides 318A-318D. The example illustrated in FIG. 3 shows four separate groups of participants simultaneously in the virtual experience; in general, however, a virtual experience can support more or fewer simultaneous participant groups depending on demand, number of available guides, among other factors. In some embodiments, the phases include a lobby phase 302, a briefing room phase 304, a suit-up phase 306, a pre-launch phase 308, a virtual experience phase 310, a disembark phase 312, and a suit-down phase 314 (where the suit-down phase 314 leads back to the lobby phase 302). A general description of the phases is provided here with respect to FIG. 3; a guide's perspective and use of a guide application to assist with the various phases is described in more detail hereinafter with respect to FIGS. 4-14.

In some embodiments, a virtual experience begins in the lobby phase 302, for example, when one or more participants arrive at a virtual experience location. During the lobby phase 302, participants can check-in for a previously reserved virtual experience time or purchase admission for future virtual experience time depending on availability. Participants can be further grouped into teams based on either on requested groupings or based on availability. Once formed, a team can be assigned to an available guide (e.g., an available guide 318A can be assigned to team 316A awaiting entry into a particular virtual experience) that will assist the team through subsequent phases.

In an embodiment, once a queued team is able ready to enter a designated virtual experience (e.g., once the team is assigned a guide and space in the experience flow is available for the team), the team first enters a briefing room phase 304. During the briefing room phase 304, the team is provided with information about the virtual experience with which the team is about to engage. For example, an informational video may be played for the team participants and the guide may provide further explanation about what the team is to expect during the virtual experience. In some embodiments, a guide further assists with assigning an avatar to some or all of the team participants, where the avatar may correspond to a type of character or other aspect of the particular virtual experience. Each of the team participants may be able to choose a desired avatar from a set of possibly avatars or avatars may be assigned to team participants based on other criteria.

In some embodiments, once a team has received briefing information for their designated virtual experience and has been assigned avatars, the participant team proceeds to a suit-up phase 306. During the suit-up phase 306, each of the team participants is provided with a rig (e.g., an HMD and other possible equipment) and the provided rig is assigned to the corresponding team participant (e.g., so that the server system can associate particular rigs with particular team participants). A guide can assist the team participants with putting on their assigned rigs and otherwise preparing the team for the experience.

In some embodiments, once the team participants have obtained their rigs, the team can proceed to a pre-launch phase 308. During the pre-launch phase 308, the assigned guide can cause each of the team participants to "launch" into the virtual experience (e.g., by causing the participant's rigs to launch the designated virtual experience in coordination with a centralized virtual experience system). In some embodiments, a guide can help confirm that each of the team participant's rigs are operating as expected and can help troubleshoot any operational issues that may arise (e.g., troubleshoot issues with a participant's visual display or audio within an HMD).

In some embodiments, once a guide has confirmed that all team participants' have successfully launched into the virtual experience, the team proceeds to a virtual experience phase 310 wherein the team of participants engages with the virtual experience on a stage. As shown in FIG. 3, multiple teams with respective guides can progress through the virtual experience phase 310 simultaneously in a staggered fashion. As described in more detail herein, a guide can perform various operations during the virtual experience phase 310 to monitor the teams' traversal through the experience, troubleshoot operational issues, interact with team participants at designated points, and otherwise enhance their assigned teams virtual experience.

In some embodiments, once a participant team has completed the designed virtual experience in the virtual experience phase 310, the team proceeds to a disembark phase 312. During the disembark phase 312, a guide helps their assigned team conclude the virtual experience or assist the team with repeating the same virtual experience or engaging with a different virtual experience.

In some embodiments, once a participant team has concluded their virtual experience session, the team proceeds to the suit-down phase 314 where the guide assists the team participants with removing their rig equipment, obtaining memorabilia from their experience, purchasing other related merchandise, among other possible interactions. Once the participant team has successfully suited-down and completed their experience, the participants can proceed back to the lobby to either purchase admission for future virtual experiences or exit the physical location.

Figure 4:
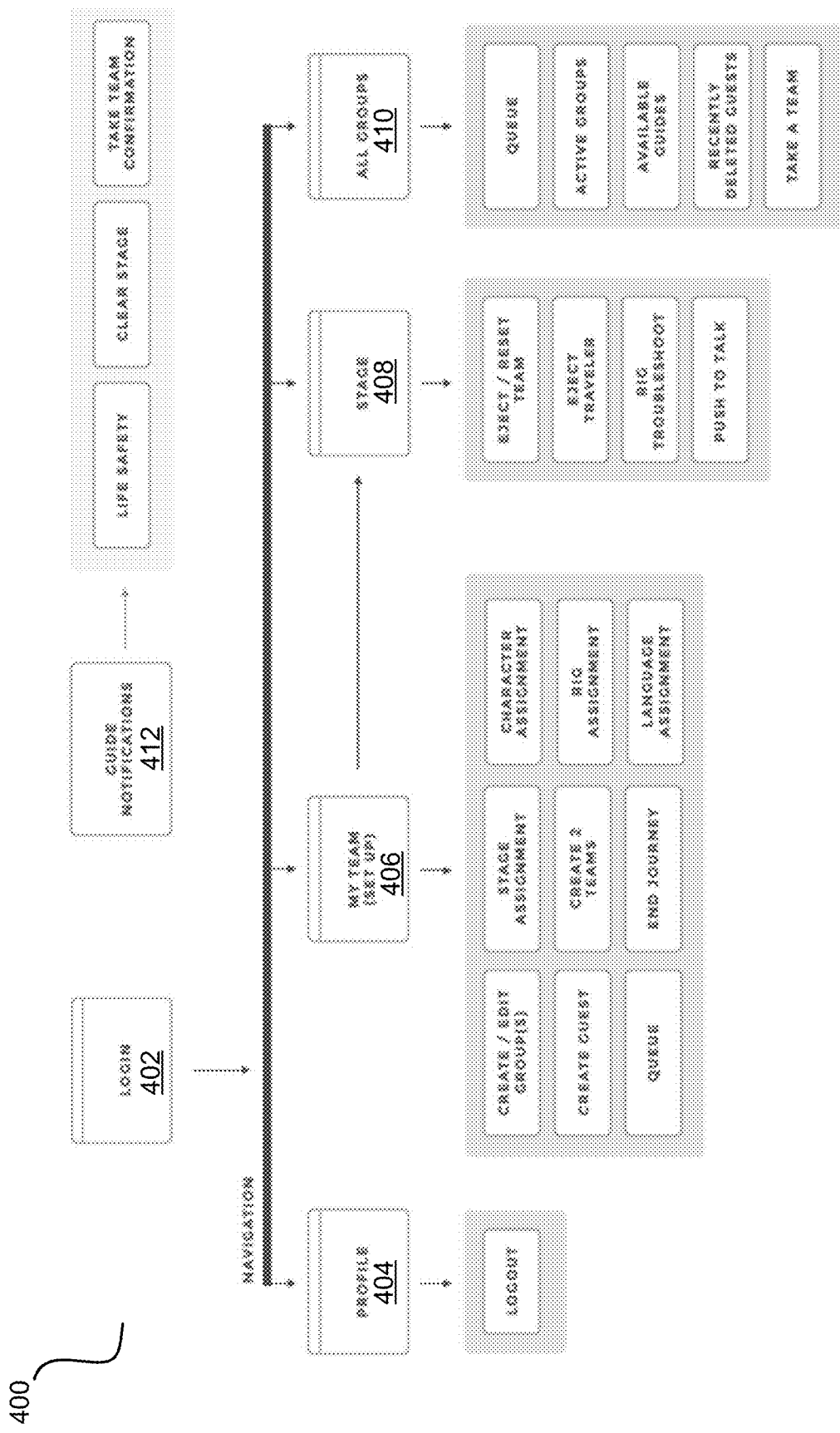
FIG. 4 is a diagram illustrating a navigational flow within an application used by guides during a guide-assisted virtual experience according to some embodiments.

FIG. 4 illustrates an example of a navigational flow within a guide application according to some embodiments. As indicated elsewhere herein, the guide application generally represents a software-based application that guides can use to help usher assigned teams through the end-to-end virtual experience event. In some embodiments, the guide application runs on one or more computing devices that a guide can use as the guide progresses through a virtual experience with an assigned team. A high-level description of the navigational flow is provided here with respect to FIG. 4 while more detailed examples of guide application interfaces are described hereinafter with respect to FIGS. 5-14. For example, the navigational flow 400 for a guide application may typically begin at a login interface 402, where a guide provides a username and password or other authentication information.

As shown in FIG. 4, once a guide has logged into a guide application, the guide can navigate either to a profile configuration interface 404 or a team setup interface 406. Using the team setup interface 406 and other associated interfaces, a guide can perform a variety of team configuration processes such as, for example, creating and editing groups, creating new participants, viewing and modifying participants and participant teams, viewing stage assignments, creating new teams, assigning characters/avatars to participants, assigning languages to participants, ending an experience journey for a team, among other possible options.

In some embodiments, from one or more of the team setup interfaces 406, a guide can navigate to a stage interface 408 once team assigned to a guide has entered onto a stage for a particular virtual experience. Using the stage interface 408 and other related interfaces, a guide can eject or reset a team, eject a participant from a team, troubleshoot one or more participants' rigs, communicate with one or more participants via the participants' HMDs, among other possible options.

In some embodiments, a guide can also access an all groups interface 410 from one or more of the previously described interfaces. A guide further can use an all groups interface 410, for example, to view information about other participant groups currently awaiting assignment of a guide, groups assigned a guide and active within a particular virtual experience, guides that are awaiting assignment to a group, participants/groups that were recently deleted from the application, and interface elements that enable a guide to take control of a team.

In some embodiments, a guide application further includes the ability for various types of asynchronous notifications 412 to be sent to the guide application to alert a guide to various operational occurrences. For example, while the guide is viewing any of the aforementioned interfaces or others, a guide application may receive and display various types of notifications such as, for example, a notification that a participant of the guide's team or another team is experiencing an issue (e.g., to indicate that a participant has fallen, that a participant is experiencing a medical issue, etc.), a notification that the guide needs to help his or her team progress to a next phase of the virtual experience (e.g., because the guide's team is proceeding too slowly and is holding up teams in earlier stages of the virtual experience), or a notification that a guide is being assigned to a particular team and is to usher the team through the remaining phases of the virtual experience, and the like.

Figure 5:
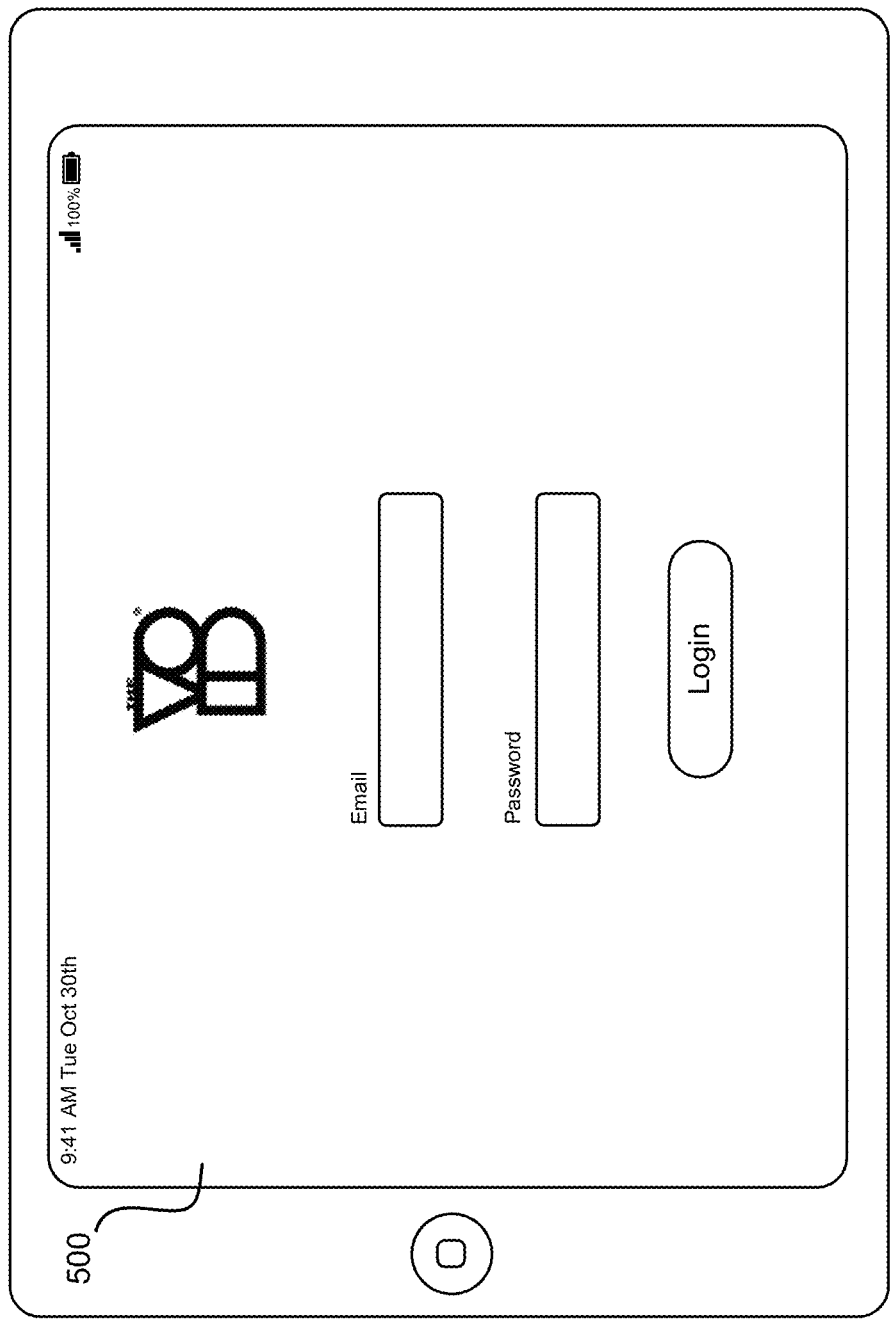
FIG. 5 illustrates an example of a login interface as part of a guide application according to some embodiments.

FIG. 5 illustrates an example of a login interface that may be part of a guide application according to some embodiments. The login interface 500, for example, includes interface elements that a virtual experience guide can use to authenticate herself or himself with a centralized system (e.g., using an email address and password or other login credentials). Once authorized by the virtual experience operator, a guide can be associated with a user account that stores various profile information about the guide including, for example, the guide's name, a physical location at which the guide works, a photo or other image representing the guide, various guide application preferences as configured by the guide, guide performance metrics measured based on previous virtual experiences managed by the guide, among other possible information. this account information, for example, can be used to tailor the guide application in various ways for each individual guide and to help provide to a centralized system an identity of a guide that is currently using a particular guide computing device (e.g., so that the guide's location and status within the virtual experience location can be monitored).

Figure 6A:
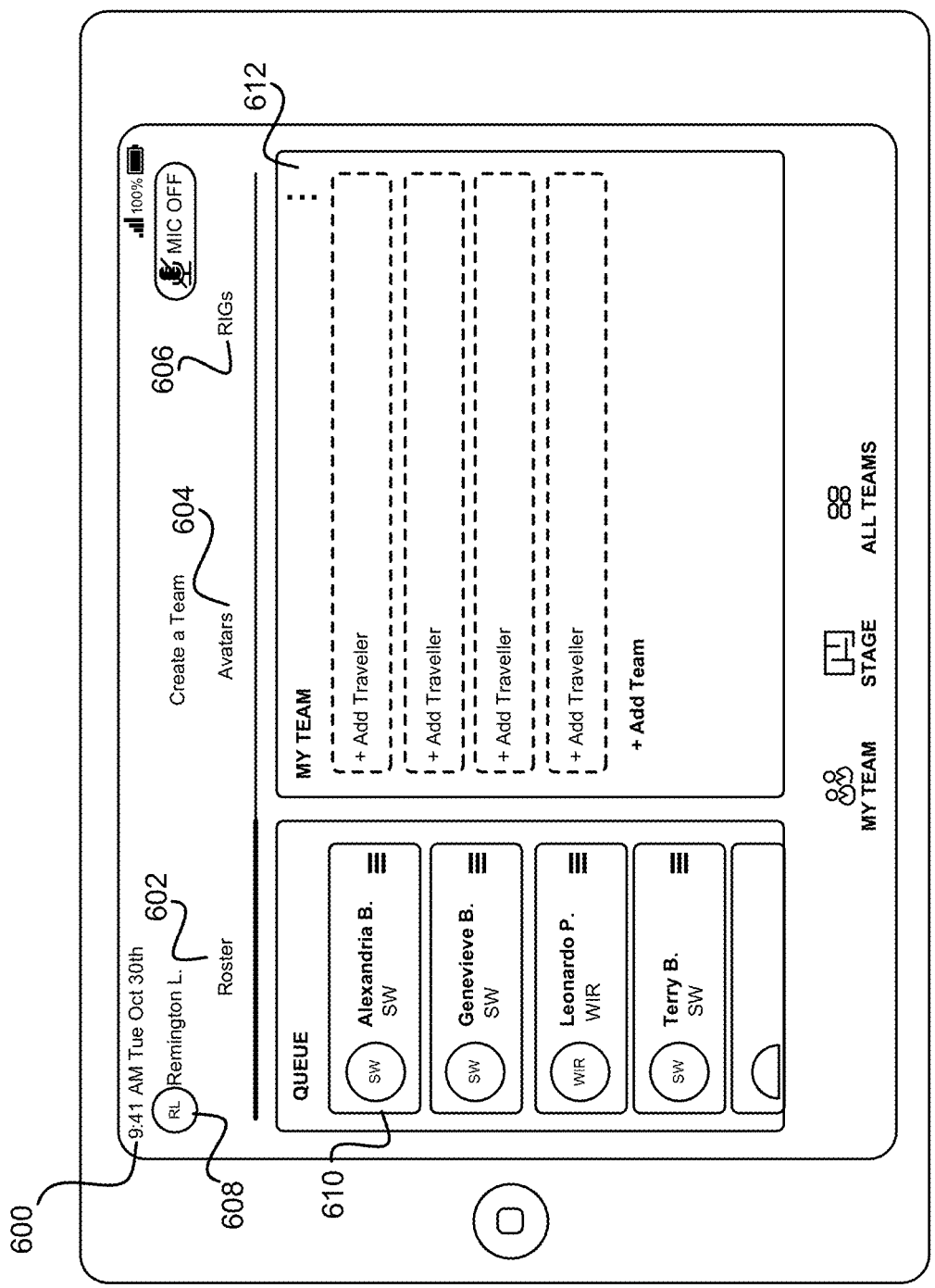
FIG. 6A illustrates an example of a team creation interface as part of a guide application according to some embodiments.

FIG. 6A illustrates an example of a team creation interface as part of a guide application according to some embodiments. The team creation interface 600 may be displayed, for example, after a guide has logged in to the guide application using the login interface 500 described above. The team creation interface 600 includes several selectable views including a roster view 602, an avatars view 604, and a rigs view 606. The team creation interface 600 also includes a guide account indicator 608, which displays a current guide's name and icon and, in some embodiments, may be selected to configure various guide preferences.

In some embodiments, a roster view 602 includes a queue of participants 610 awaiting assignment to a team, or group. As shown, each entry in the participant queue includes a name of the participant and an indication of a particular virtual experience for which the participant is awaiting entry. The indication of the particular virtual experience can assist guides with assembling participants into teams that are awaiting entry into a same virtual experience. The queue of participants may be ordered based on a time at which each participant arrived at the virtual experience location, based on requested groupings of participants, based on whether participants reserved a time or are awaiting a first availability, or based on any other conditions. As shown below in the following FIGS. 6B, 6C, and 6D, a guide can select participants from the queue and add selected participants to a team in the team creation panel 612, for example, by dragging and dropping the selected participants to open slots on a team.

Figure 6B:
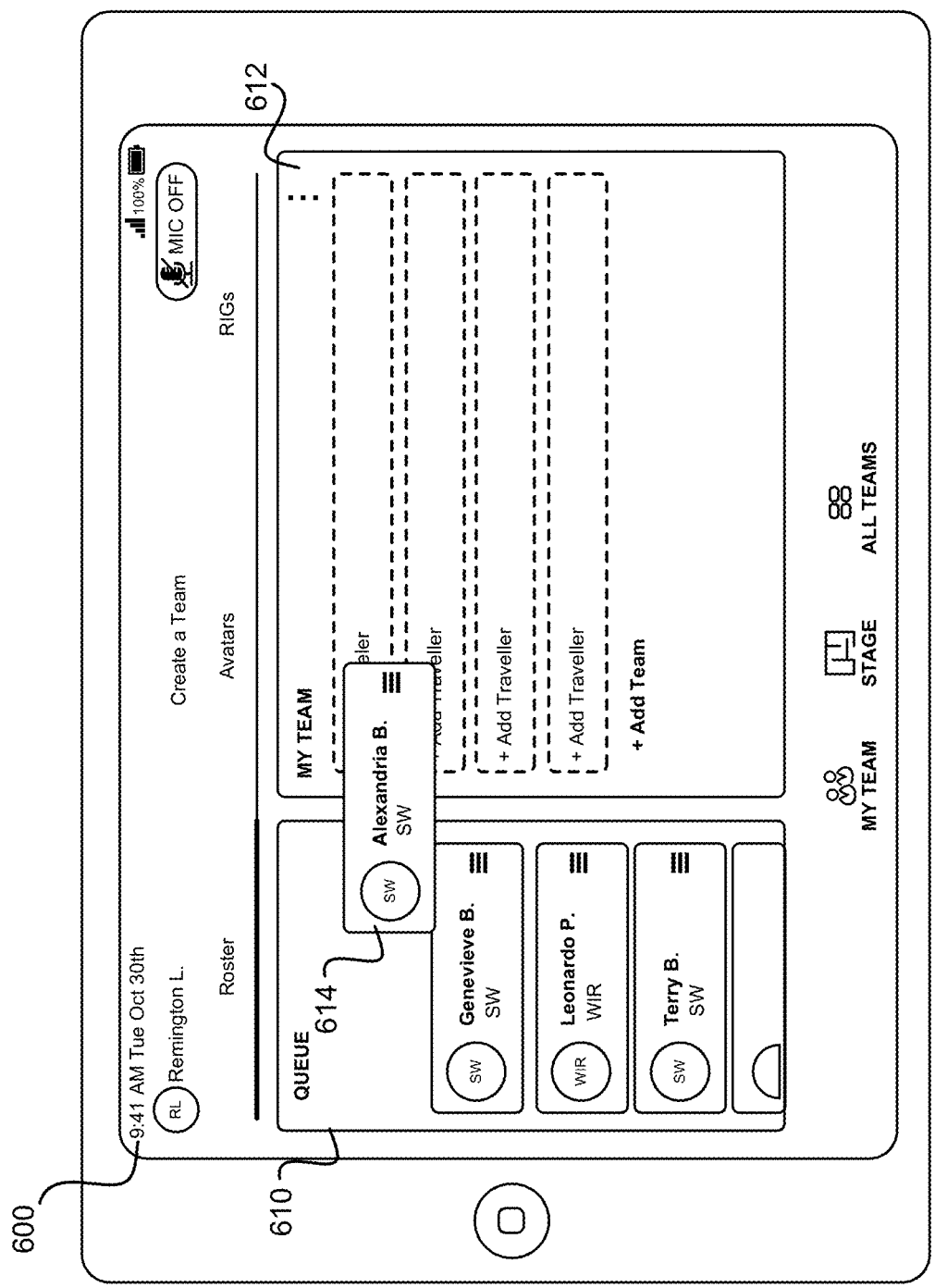
FIG. 6B illustrates an example of adding a participant to a team in a team creation interface according to some embodiments.

FIG. 6B illustrates an example of adding a participant to a team in a team creation interface according to some embodiments. As indicated above, guides can select participants from the queue of participants 610 and add selected participants to open slots on teams in a team creation panel 612. In FIG. 6B, for example, a guide has selected an entry 614 corresponding to a participant named "Alexandria B." and is in the process of moving the participant to the first open slot of a team identified by the label "My Team."

Figure 6C:
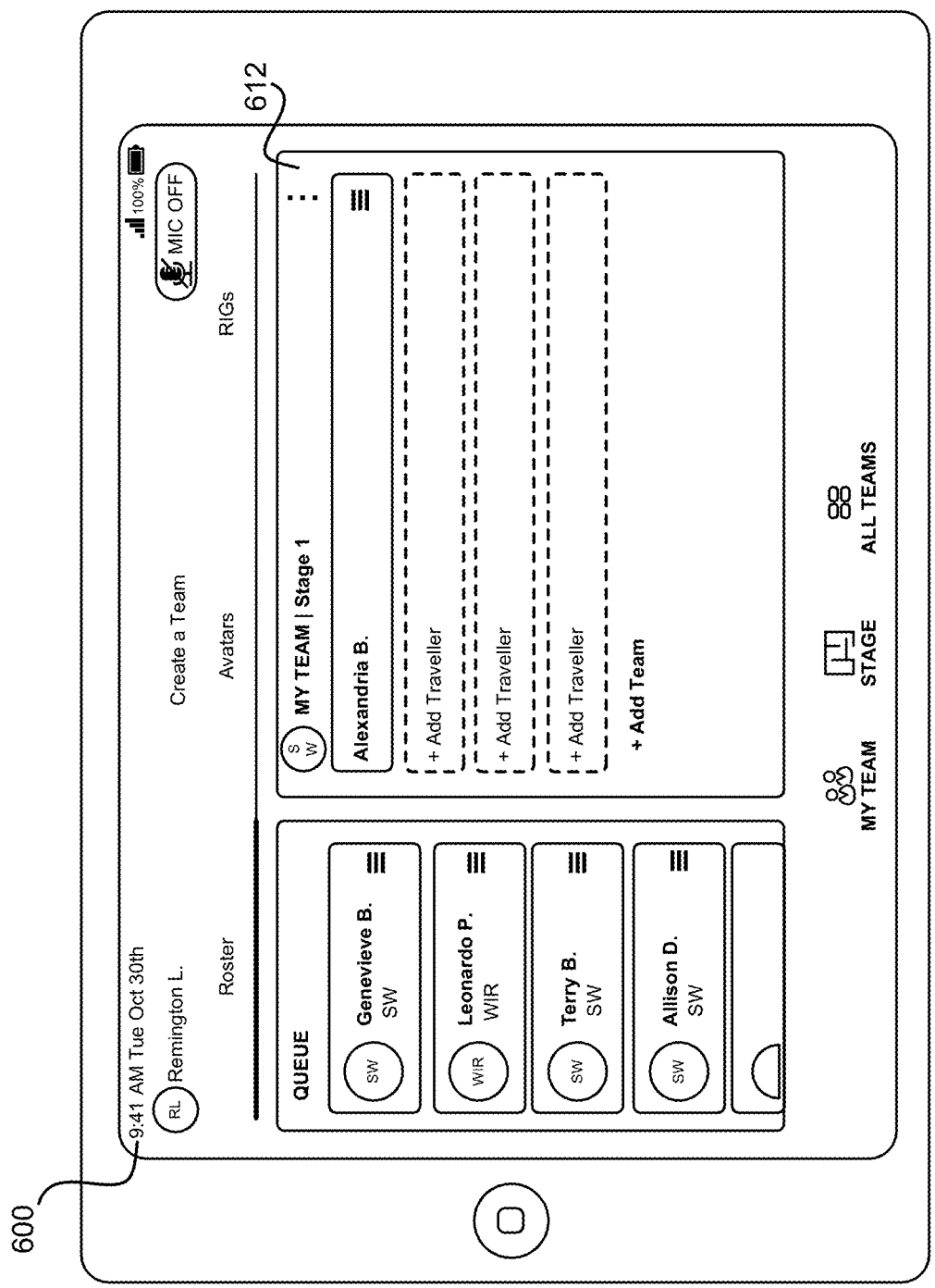
FIG. 6C illustrates an example of a participant added to a team in a team creation interface according to some embodiments.

FIG. 6C illustrates an example of a participant added to a team in a team creation interface according to some embodiments. As shown, the team shown in the team creation panel 612 now includes the participant named "Alexandria B." The team is further associated with a stage (identified by the label "Stage 1") to be used for the virtual experience associated with the team. A guide can further add additional participants to the same team or create a new team and add participants to a new team. In some embodiments, a particular virtual experience may involve the creation of multiple separate teams (e.g., competing teams or separately cooperating teams) and the guide can assign users to the separate teams accordingly.

Figure 6D:
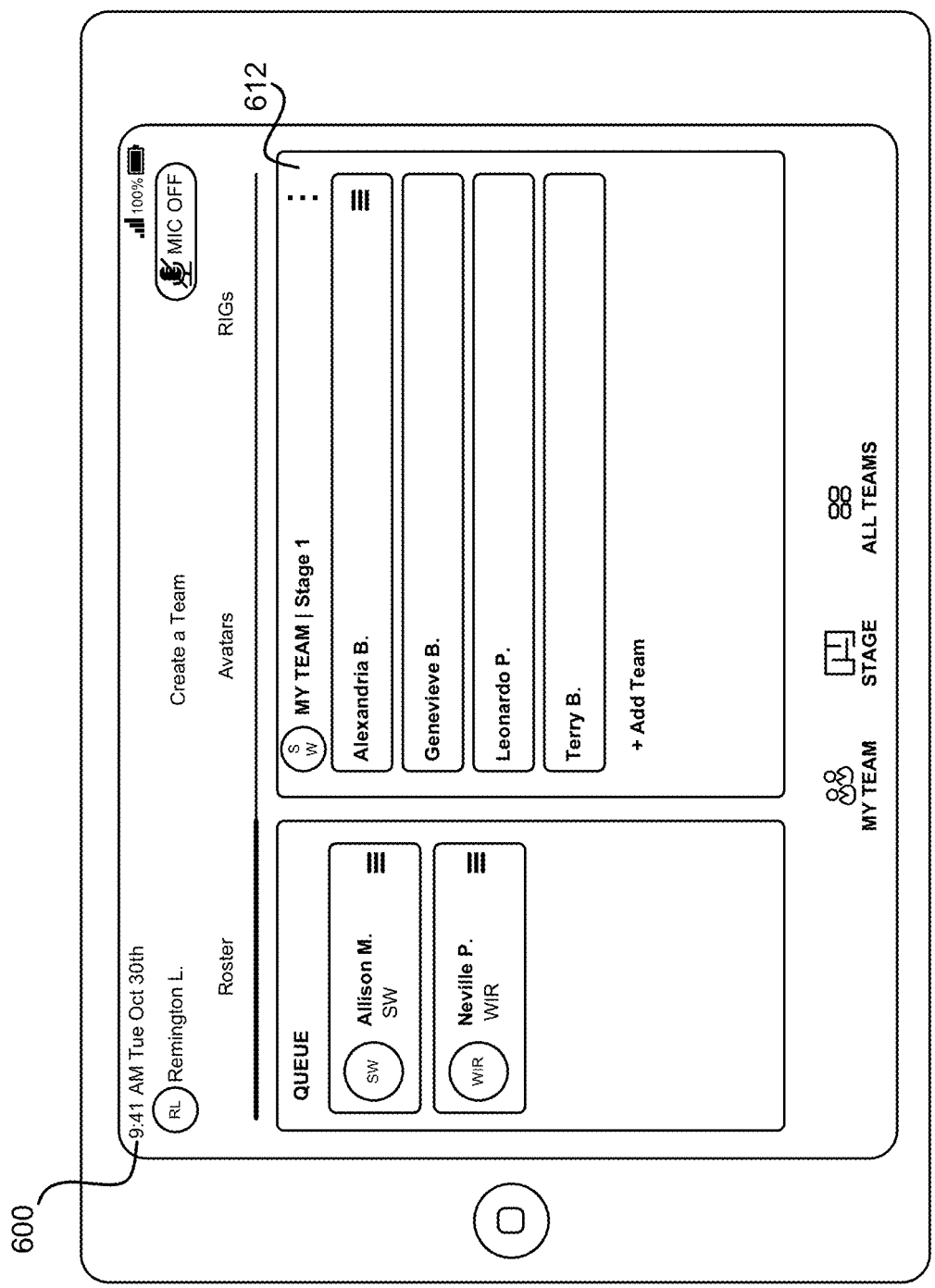
FIG. 6D illustrates an example of a complete team of participants displayed in a team creation interface of a guide application according to some embodiments.

FIG. 6D illustrates an example of a complete team of participants displayed in a team creation interface of a guide application according to some embodiments. As shown in FIG. 6D, four participants have been added to the team resulting in a full team of participants shown in the team creation panel 612. Although a maximum of four participants is shown in the example interfaces of FIGS. 6A-6D, in other embodiments, teams can include any number of participants depending on the particular virtual experience, stage size, among other factors.

Figure 7A:
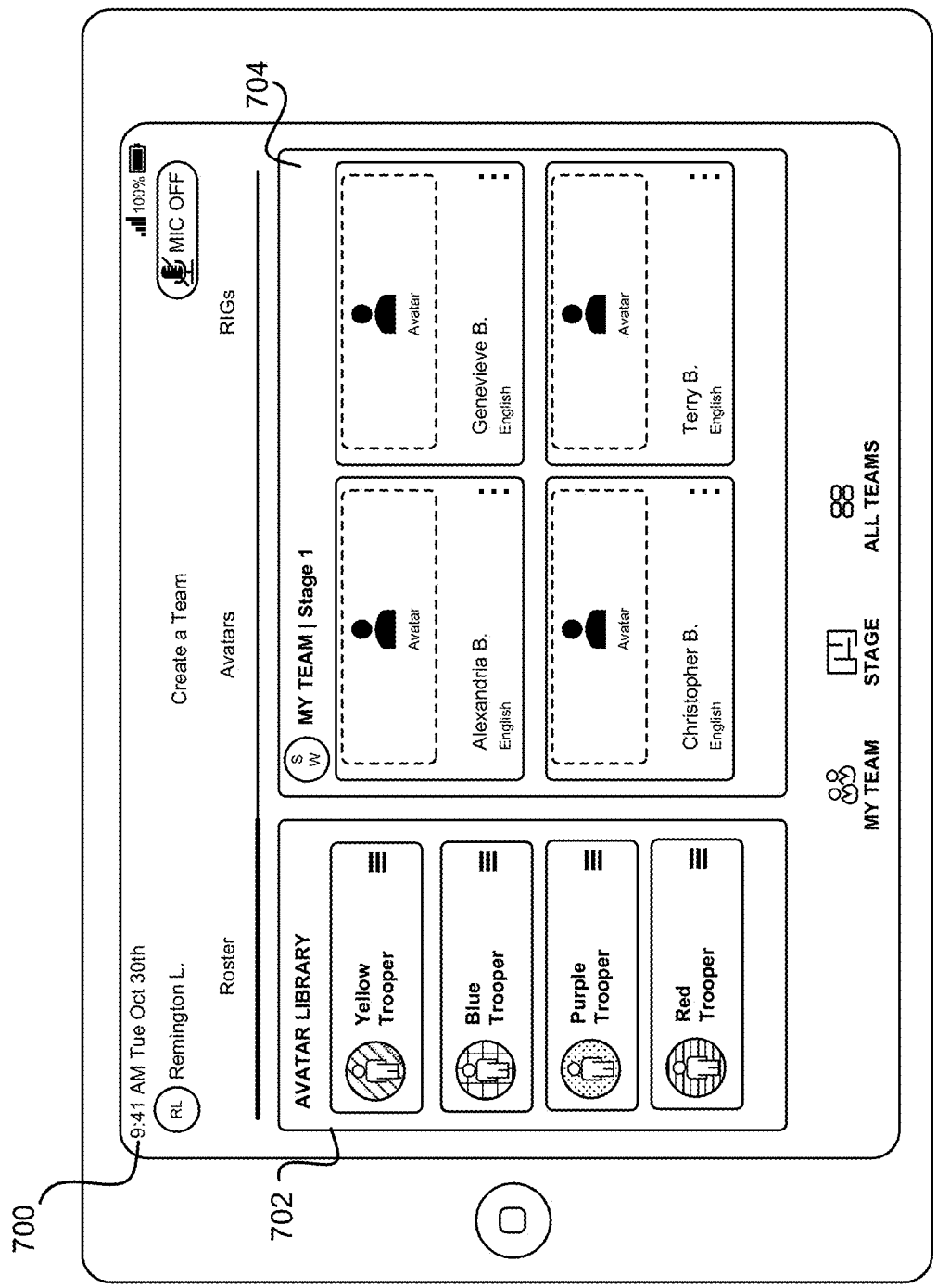
FIG. 7A illustrates an example of an interface used to assign avatars to team participants according to some embodiments.
Figure 7B:
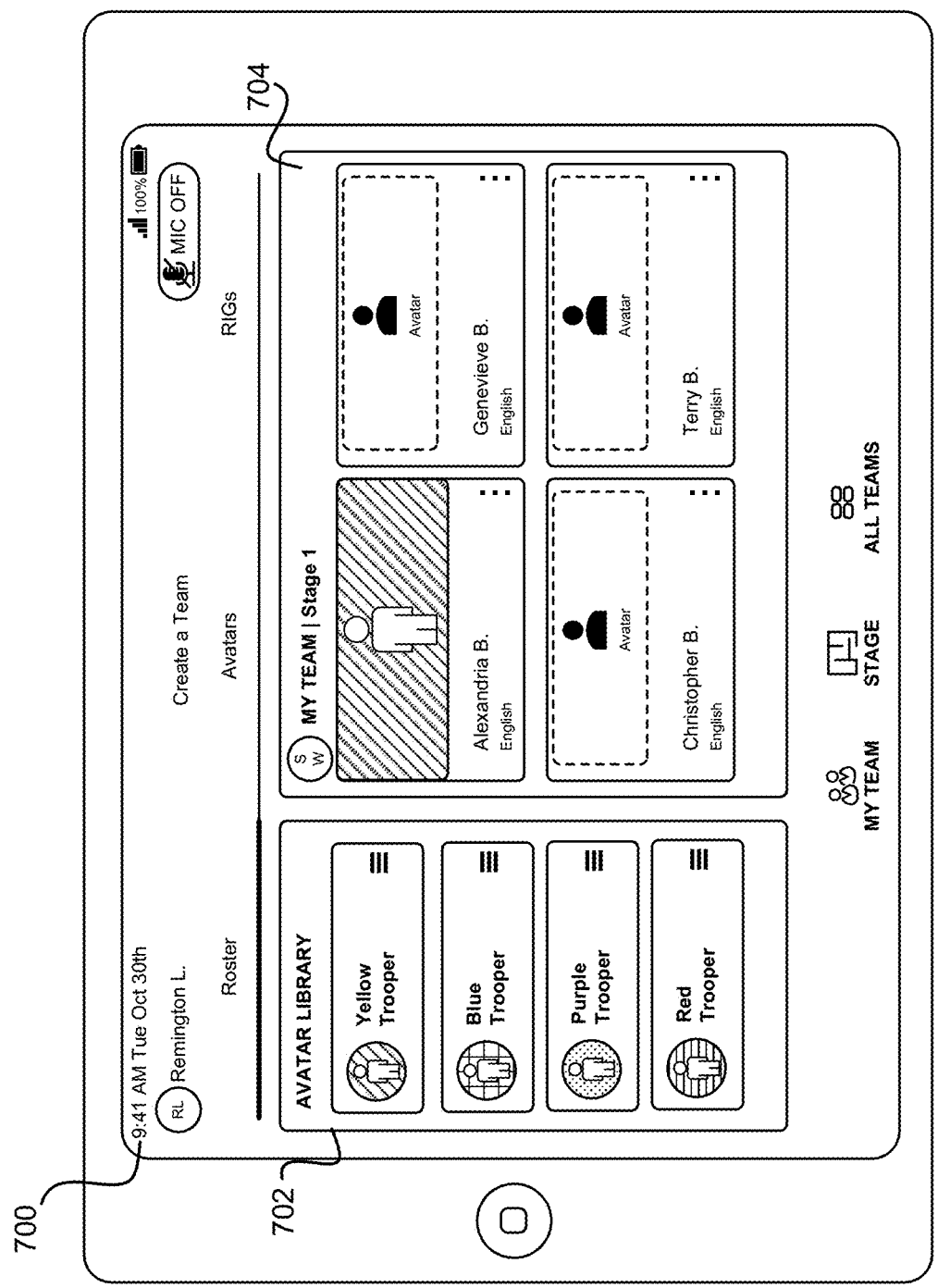
FIG. 7B illustrates an example of an avatar assigned to a team participant as part of an avatar assignment interface according to some embodiments.

FIG. 7A illustrates an example of an interface used to assign avatars to team participants according to some embodiments. A guide may access the avatar assignment interface 700, for example, by selecting the "Avatars" display option 706 or the interface may be displayed automatically based on creation of a team as shown in FIGS. 6A-6D. The avatar assignment interface 700 includes an avatar library panel 702 and a team panel 704. As shown, the avatar library panel 702 includes possible avatars that can be assigned to the participants shown in the team panel 704. The avatars available in the avatar library, for example, may depend on the particular virtual experience that the team is awaiting to participate in. As illustrated in FIG. 7B, a guide can assign avatars to particular participants of a team by first selecting a desired avatar from the avatar library 702 and then selecting a corresponding team participant to which the selected avatar is to be assigned (e.g., by dragging and dropping an avatar from the avatar library panel 702 to a particular participant displayed in the team panel 704.

As indicated above, FIG. 7B illustrates an example of an avatar assigned to a team participant as part of an avatar assignment interface according to some embodiments. As shown, the participant named Alexandria B. has been assigned an avatar selected from the avatar library 702. A guide can continue assigning avatars to team members until all participants have been assigned, or a guide can provide input that causes avatars to be automatically assigned to team participants.

Figure 8A:
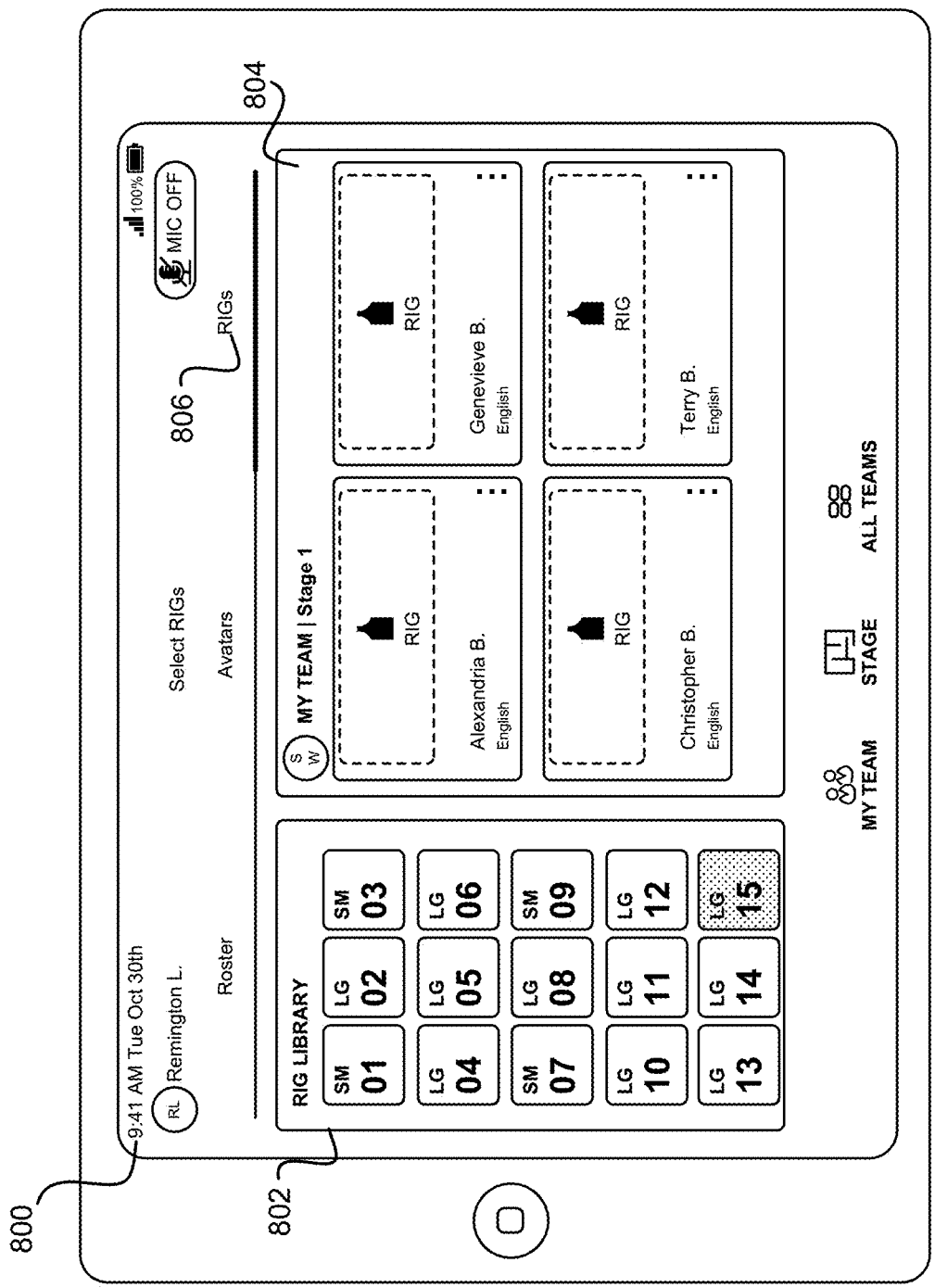
FIG. 8A illustrates an example of a rig assignment interface as part of a guide application according to some embodiments.

FIG. 8A illustrates an example of a rig assignment interface as part of a guide application according to some embodiments. A guide can access the rig assignment interface 800, for example, once the avatar assignment process shown in FIGS. 7A and 7B is complete, or by selecting the "rigs" view 806. The rig assignment interface 800, for example, includes a rig library 802 and a team panel 804.

In some embodiments, the rig library 802 shows rigs that are available to assignment to team participants, including an identifier of each rig, size information, and status information, among other possible indicators. For example, each of the icons displayed in the rig library 802 includes an identifier number for the corresponding rig (e.g., "01" or "02"), a color indicating a battery status or other health information for the rig, and an indication of whether the rig is a small or large rig (e.g. "SM" or "LG"). Similar to the team creation interface and avatar assignment interface described above, a guide can drag and drop icons representing rigs to the interface elements representing particular team participants to assign particular rigs to particular participants of a team.

Figure 8B:
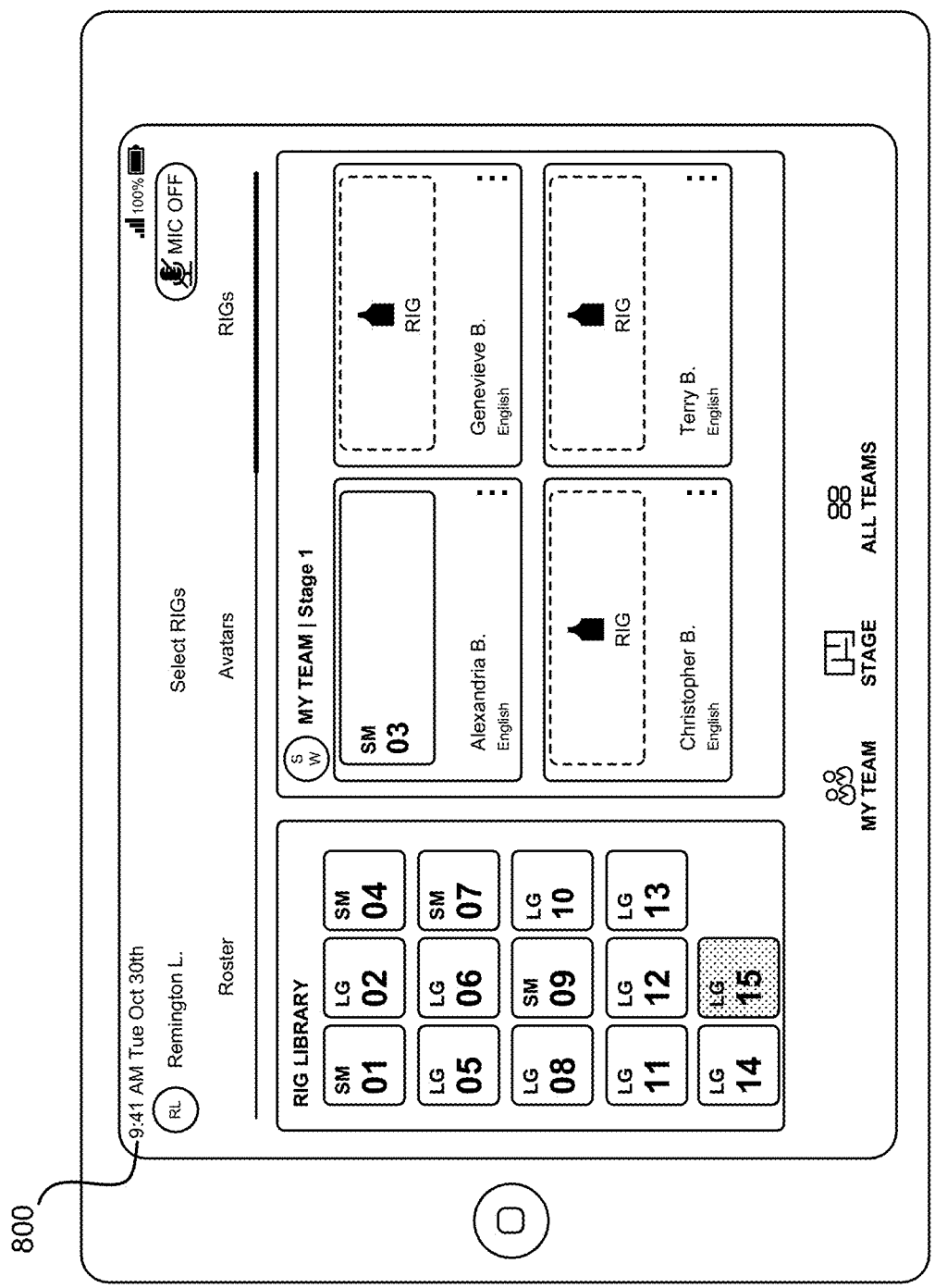
FIG. 8B illustrates an example of a rig assigned to a team participant as part of a rig assignment interface of a guide application according to some embodiments.

FIG. 8B illustrates an example of a rig assigned to a team participant as part of a rig assignment interface of a guide application according to some embodiments. The rig assignment interface 800, for example, shows that a rig identified by the label "03" has been assigned to the team participant named "Alexandria B." A guide can continue assigning rigs to other team participants, change current rig assignments if desired, and provide input once rig assignment is complete.

Figure 9:
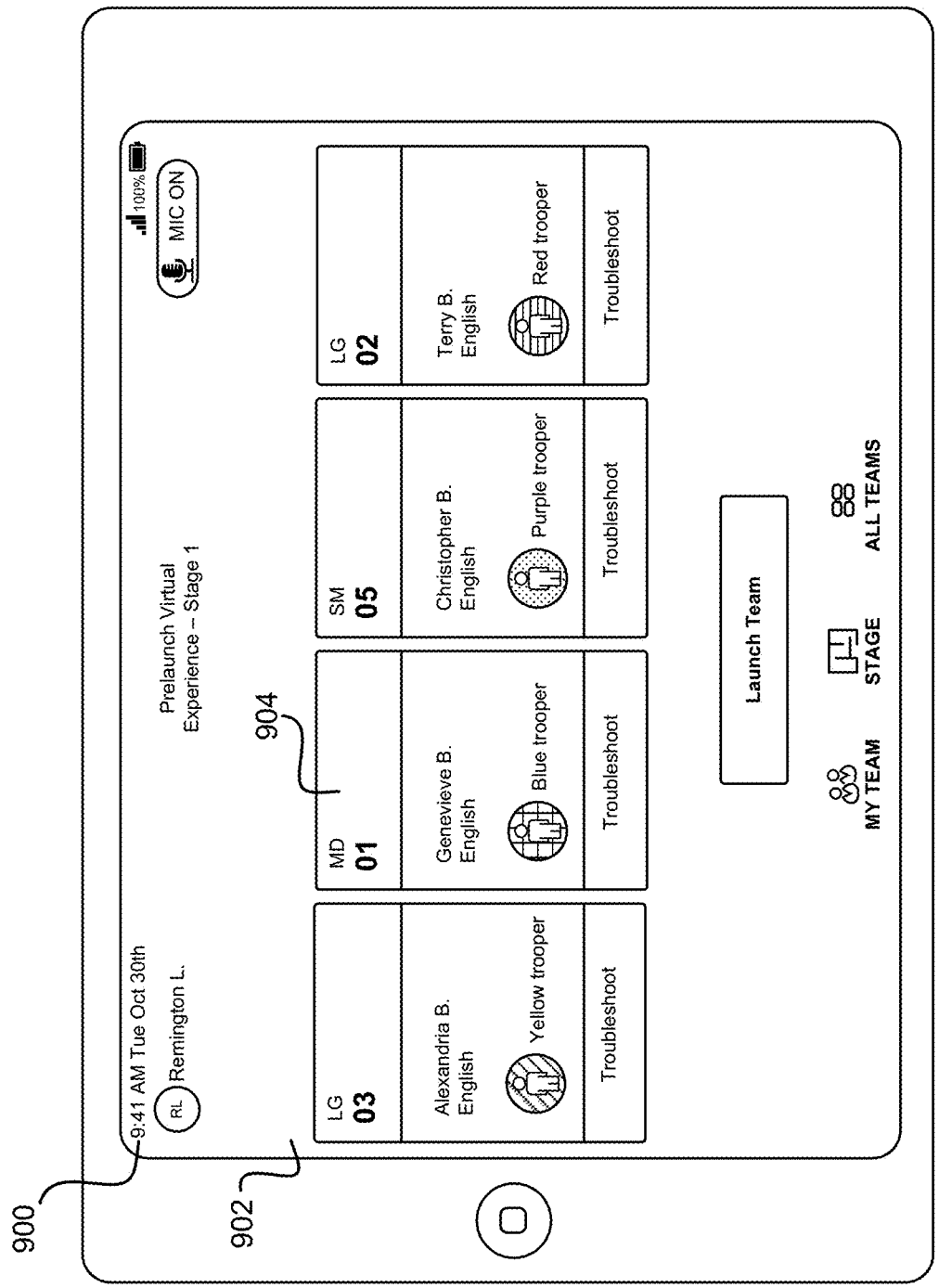
FIG. 9 illustrates an example prelaunch interface with a configured participant team within a guide application according to some embodiments.

FIG. 9 illustrates an example prelaunch interface with a configured participant team within a guide application according to some embodiments. The prelaunch interface 900, for example, shows the results of configurations that a guide has performed in the previously described team creation, avatar assignment, and rig assignment interfaces. For example, the prelaunch interface 900 includes a team panel 902 that shows individual participant panels (e.g., participant panel 904) for each participant of a team including the participant's name, a language used by the participant, an indication of which rig is assigned to the participant, an indication of which avatar is assigned to the participant, among other possible information.

In some embodiments, the prelaunch interface 900 further includes interface elements used to assist a guide with troubleshooting various issues that may arise before a team enters a virtual experience. For example, if one or more team participants are experiencing issues with their assigned rig (for example, issues with the audio, video, motion tracking, or other aspects of the participants equipment), the guide can use the prelaunch interface 900 to attempt to correct any issues, as further illustrated in FIGS. 10A-10C.

Figure 10A:
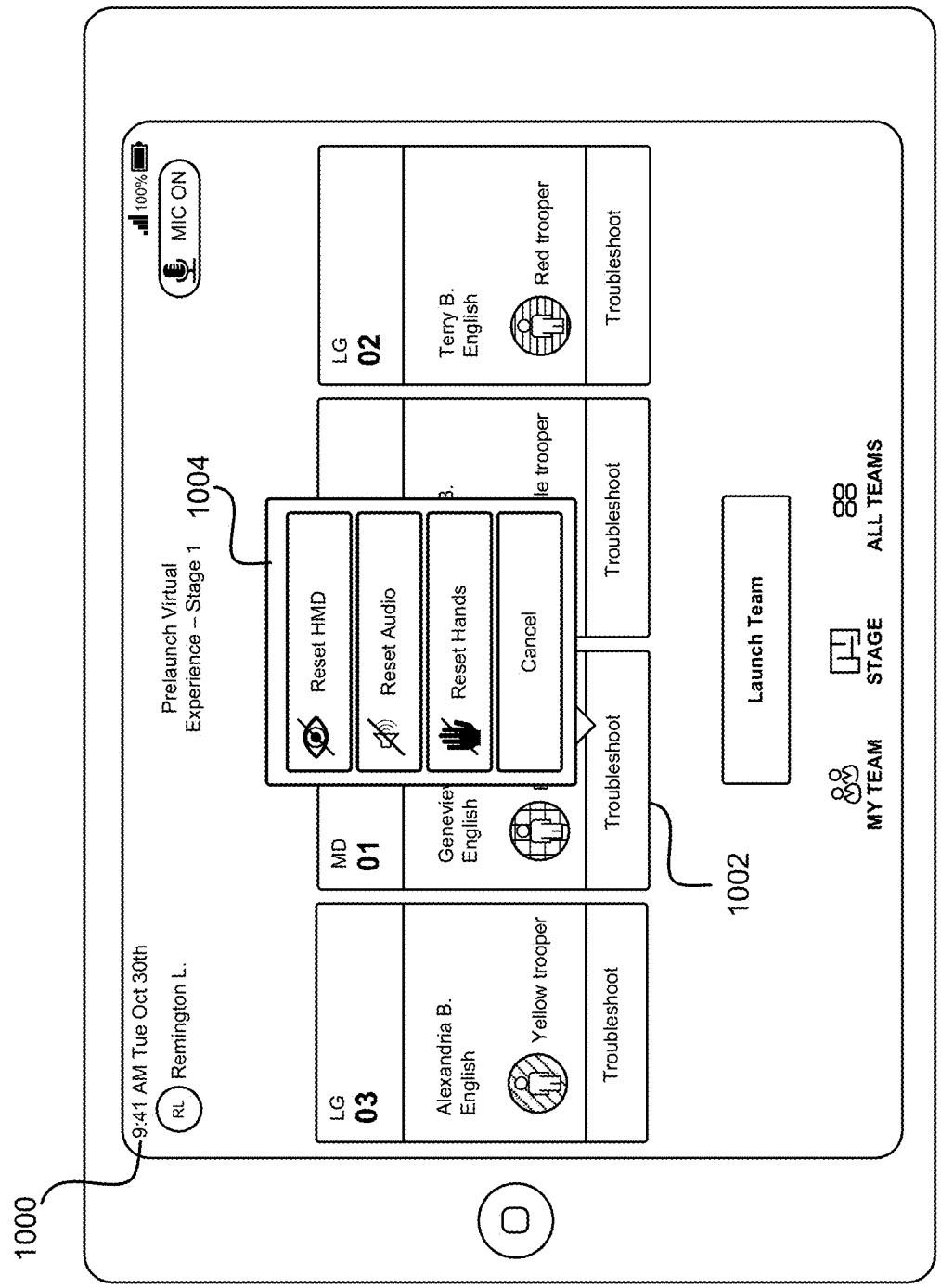
FIG. 10A illustrates an example of troubleshooting options within a guide application that can be used to troubleshoot issues associated with one or more team participants according to some embodiments.

FIG. 10A illustrates an example of troubleshooting options that a guide can use within a guide application to troubleshoot various issues that may arise with one or more team participants according to some embodiments. As shown in the prelaunch interface 1000, for example, a guide has selected the "Troubleshoot" button 1002 causing display of the troubleshooting options menu 1004. The troubleshooting options menu 1004 includes various options that can be used to address issues a participant may be experiencing with their rig or other equipment, for example, by resetting the participant's HMD, resetting a participant's audio, resetting a participant's hand tracking, or combinations thereof. These actions can be easily performed by a guide using the guide application and without the guide having to directly access a participant's rig. In some embodiments, the troubleshooting commands can be sent to a participant's rig indirectly via a centralized server or directly to the participant's rig from the guide's device running the guide application.

Figure 10B:
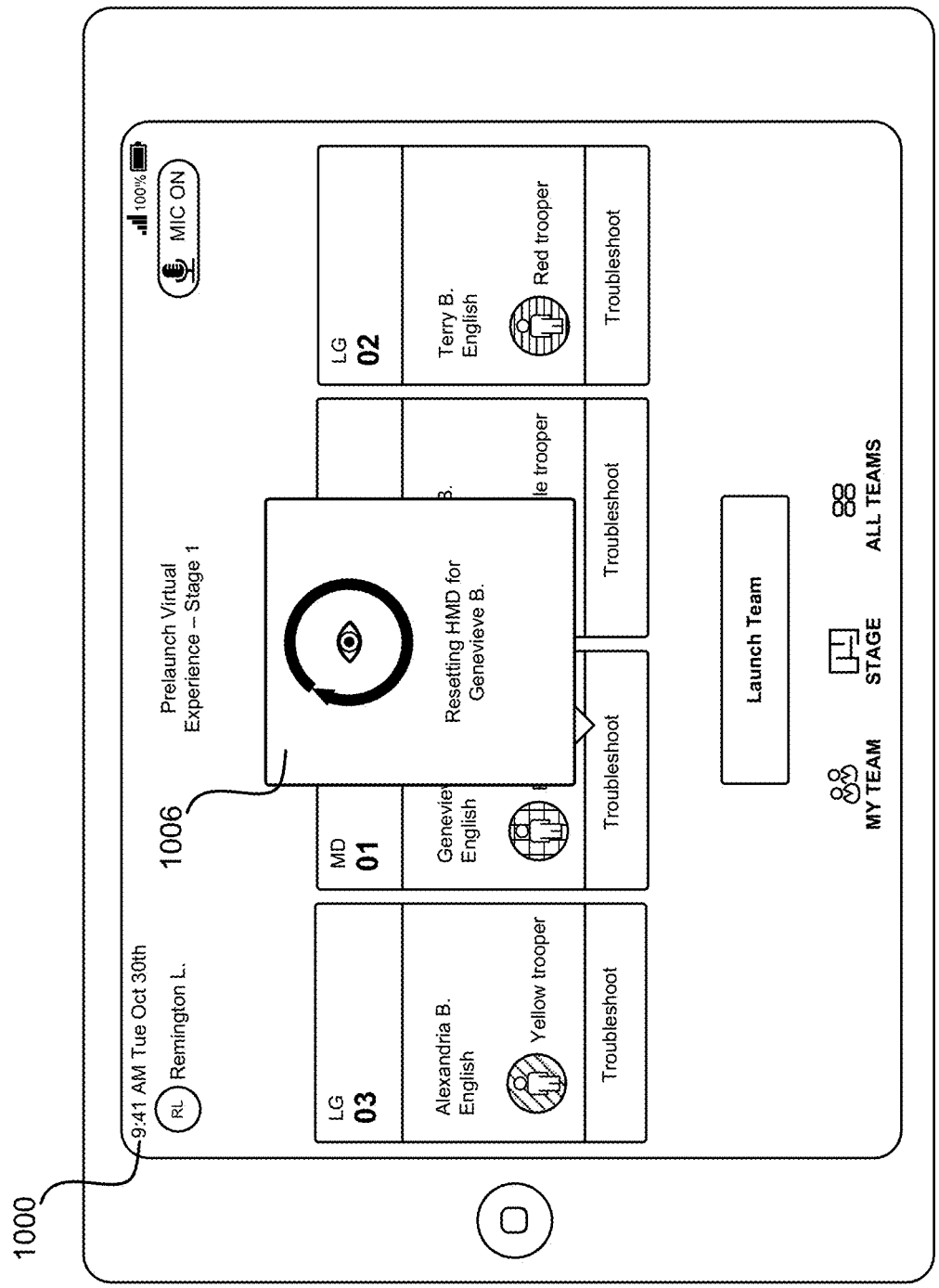
FIG. 10B illustrates an example of an interface showing progress of a troubleshooting option selected to help resolve an issue experienced by a team participant according to some embodiments.

FIG. 10B illustrates an example of an interface showing progress of a troubleshooting option selected to help resolve an issue experienced by a team participant according to some embodiments. For example, the player panel 1006 shown in the prelaunch interface 1000 displays status information indicating that the HMD assigned to the participant named "Genevieve B." is being reset (for example, because the participant expressed to the guide that her HMD was not operating as expected and, in response, the guide used the guide application to reset the participant's HMD). In other examples, similar status information is displayed when the guide is used to perform other troubleshooting operations.

Figure 10C:
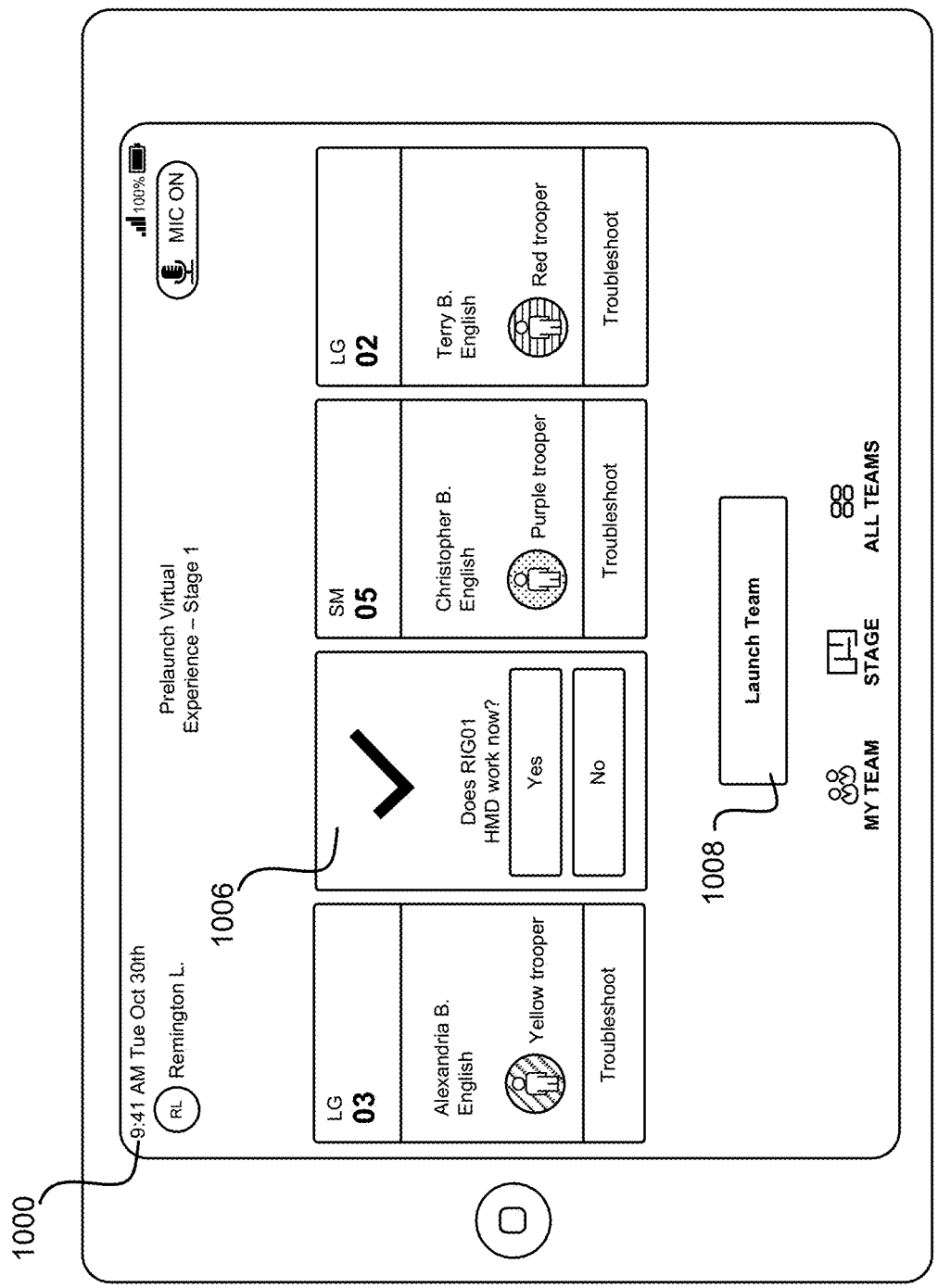
FIG. 10C illustrates an example of a troubleshooting confirmation interface of a guide application according to some embodiments.

FIG. 10C illustrates an example of a troubleshooting confirmation interface of a guide application according to some embodiments. The player panel 1006 in prelaunch interface 1000, for example, now displays a menu asking the guide whether the participant's rig is operating as expected after the troubleshooting operations were performed. If the guide provides input indicating that the participant's rig is now operating properly, the virtual experience launch process can proceed. Otherwise, the prelaunch interface 1000 may provide additional troubleshooting options or instructions to help the guide correct the issue. The prelaunch interface 1000 further includes a launch team button 1008 that can be selected by a guide once the guide has completed team configurations and addressed any issues with participants' rigs, if any exist.

Figure 11:
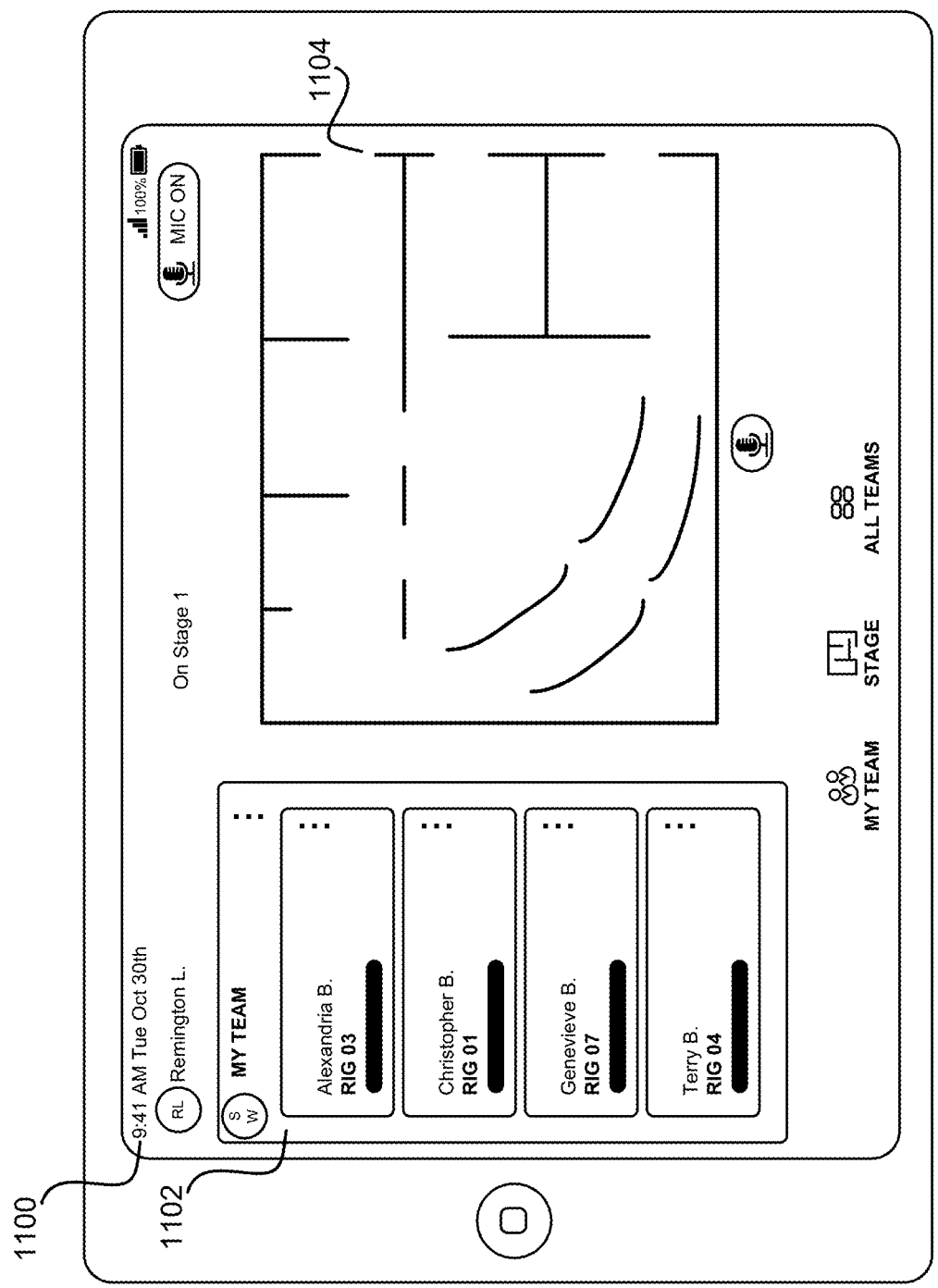
FIG. 11 illustrates an example of a virtual experience management interface of a guide application according to some embodiments.

FIG. 11 illustrates an example of a virtual experience management interface of a guide application according to some embodiments. The virtual experience management interface 1100, for example, may be displayed in response a guide selecting the launch team button 1008 shown in FIG. 10. As shown, the virtual experience management interface 1100 includes a team panel 1102 and a map panel 1104. In general, a guide can use the virtual experience management interface 1100 to monitor the guide's team's end-to-end interaction with a virtual experience including, for example, monitoring the operational status of the team participants' rigs, to monitor the team's location within the physical environment and the team's location relative to other teams that may be within the same physical environment, and to communicate with team participants, among other possible operations.

Figure 12:
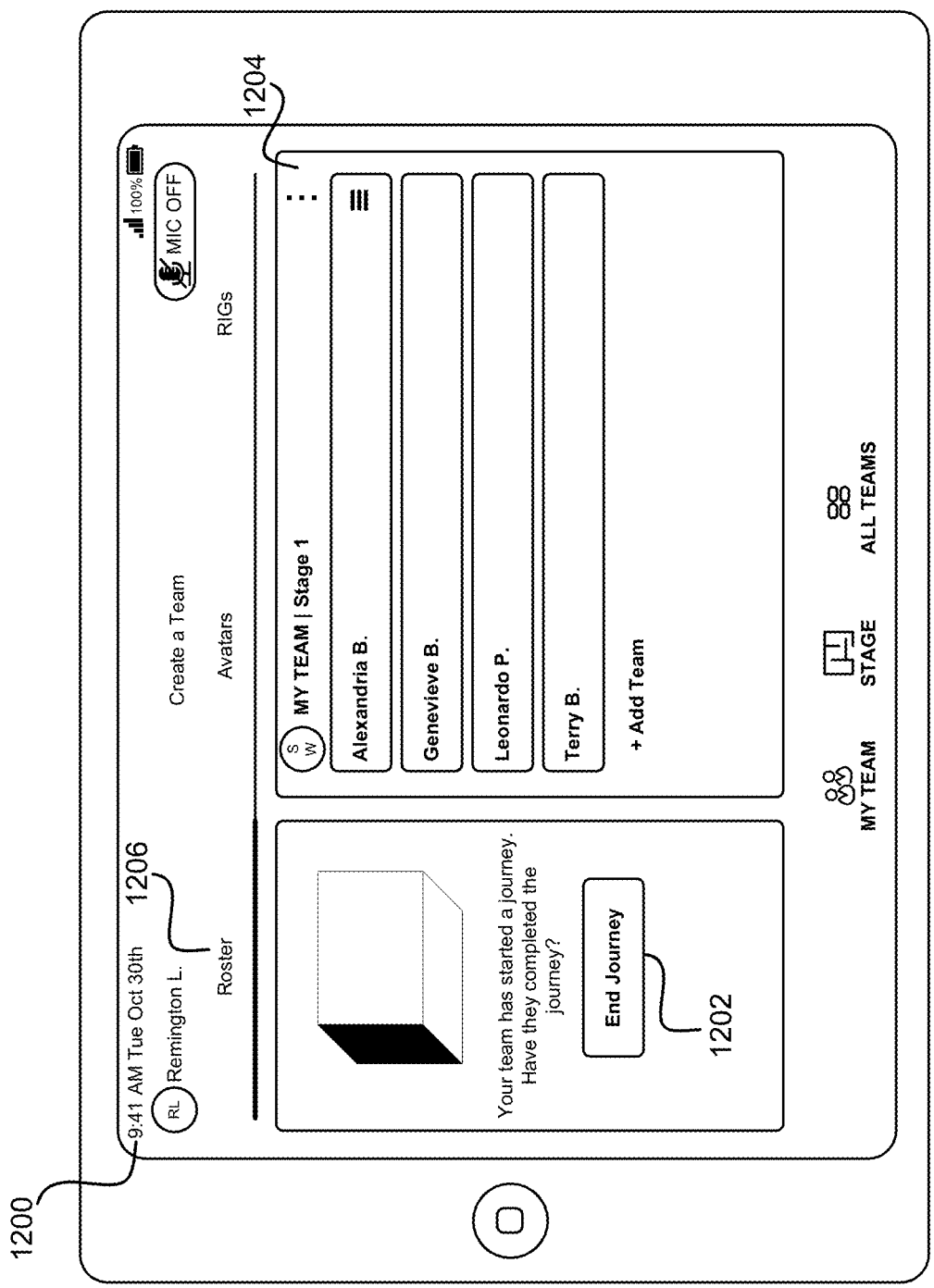
FIG. 12 illustrates a team information interface of a guide application according to some embodiments.

FIG. 12 illustrates a team information interface of a guide application according to some embodiments. The team information interface 1200, for example, may be displayed in response to a guide selecting the "my team" view option 1206 from the virtual experience management interface 1100 or any other screen while a virtual experience is in progress. As shown, the team information interface 1200 includes an "end journey" button 1202 that enables the guide to end a virtual experience once a team has completed the experience. Once the guide ends the virtual experience, the team can proceed to a suit-down area to remove their rig and otherwise conclude the experience. A guide can also use the team panel 1204 to begin the creation of a new team for a subsequent virtual experience, if desired.

Figure 13:
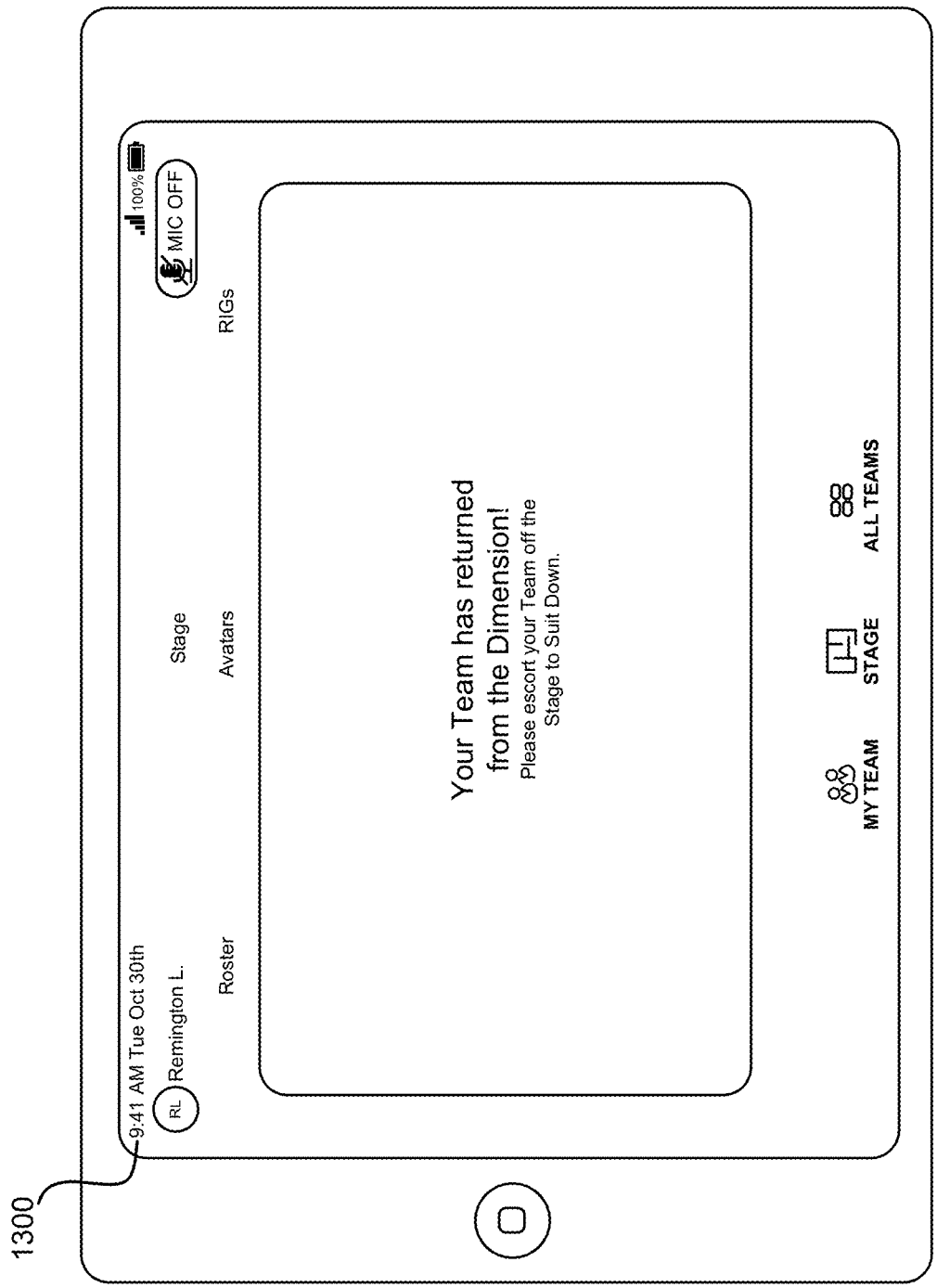
FIG. 13 illustrates an experience completion interface of a guide application according to some embodiments.

FIG. 13 illustrates an experience completion interface of a guide application according to some embodiments. As indicated above, a guide can use a virtual experience conclusion interface 1300 or other part of the guide application to end a team's virtual experience. FIG. 13 shows a virtual experience conclusion interface 1300 indicating that the guide's team has completed the experience and instructing the guide to proceed with the team to a suit-down area to remove the participants' rigs. In other embodiments, additional information may be displayed in the virtual experience conclusion interface 1300 such as, for example, a score obtained by each of the team participants, a time duration for the experience, among other possible information, if relevant.

Figure 14:
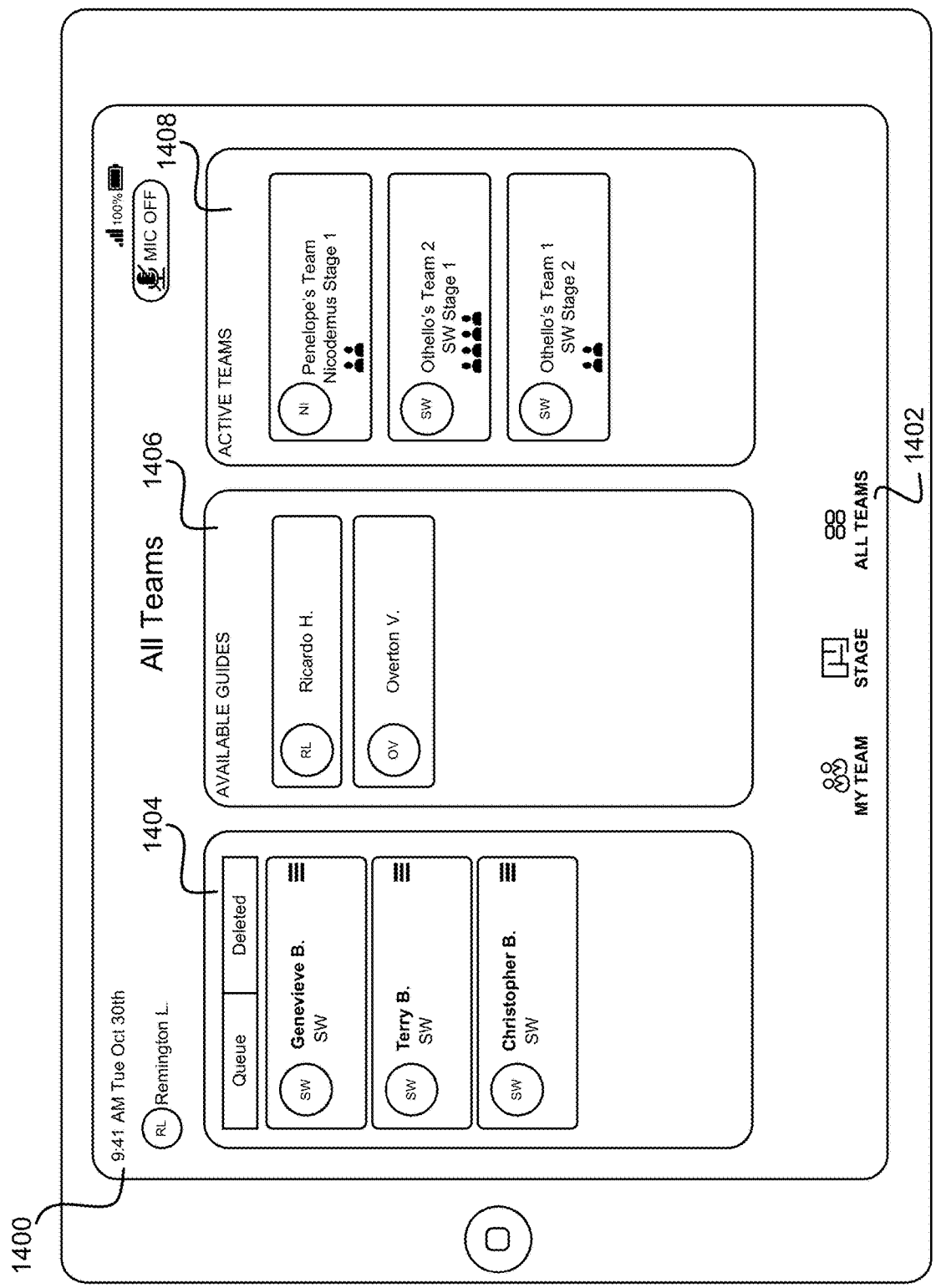
FIG. 14 illustrates an all teams interface of a guide application according to some embodiments.

FIG. 14 illustrates an all teams interface of a guide application according to some embodiments. In some embodiments, a guide or other user navigates to the all teams interface 1400 by providing input selecting the all teams icon 1402. As shown, the all teams interface 1400 includes a queued teams panel 1404, an available guides panel 1406, and an active teams panel 1408. In general, the all teams interface 1400 provides a high-level view of the status of teams either awaiting entry into a virtual experience and assignment of a guide, or teams currently assigned to a guide and currently in a virtual experience.

In some embodiments, the queued teams panel 1404 shows a list of teams that are awaiting entry into a particular virtual experience (e.g., as indicated by an icons displayed in association with each entry) and identified by a name of at least one of the team participants. The queued teams panel 1404 also enables a guide to view recently deleted teams (e.g., deleted either because the team completed a virtual experience or needed to be disbanded for other reasons).

In some embodiments, the available guides panel 1406 shows a list of guides that are not currently assigned to an active team and that are available for assignment to a queued team without an assigned guide. The list of available guides, for example, can provide an indication of who is available to usher a queued team, whether there are a sufficient number of available guides based on the number of queued teams, etc.

In some embodiments, the active teams panel 1408 shows a list of teams that are currently within an experience with an assigned guide. Each entry in the active teams panel, for example, can display some or all of: an identifier of the team (e.g., based on an icon, a name of one or more team participants, or other indicators), a physical stage at which the team is currently located, the particular virtual experience that the team is experiencing, a number of participants in the team, a location of a team within an experience, a duration of the team within the experience, operational statuses of the participants' rigs or other equipment, etc.

Figure 15:
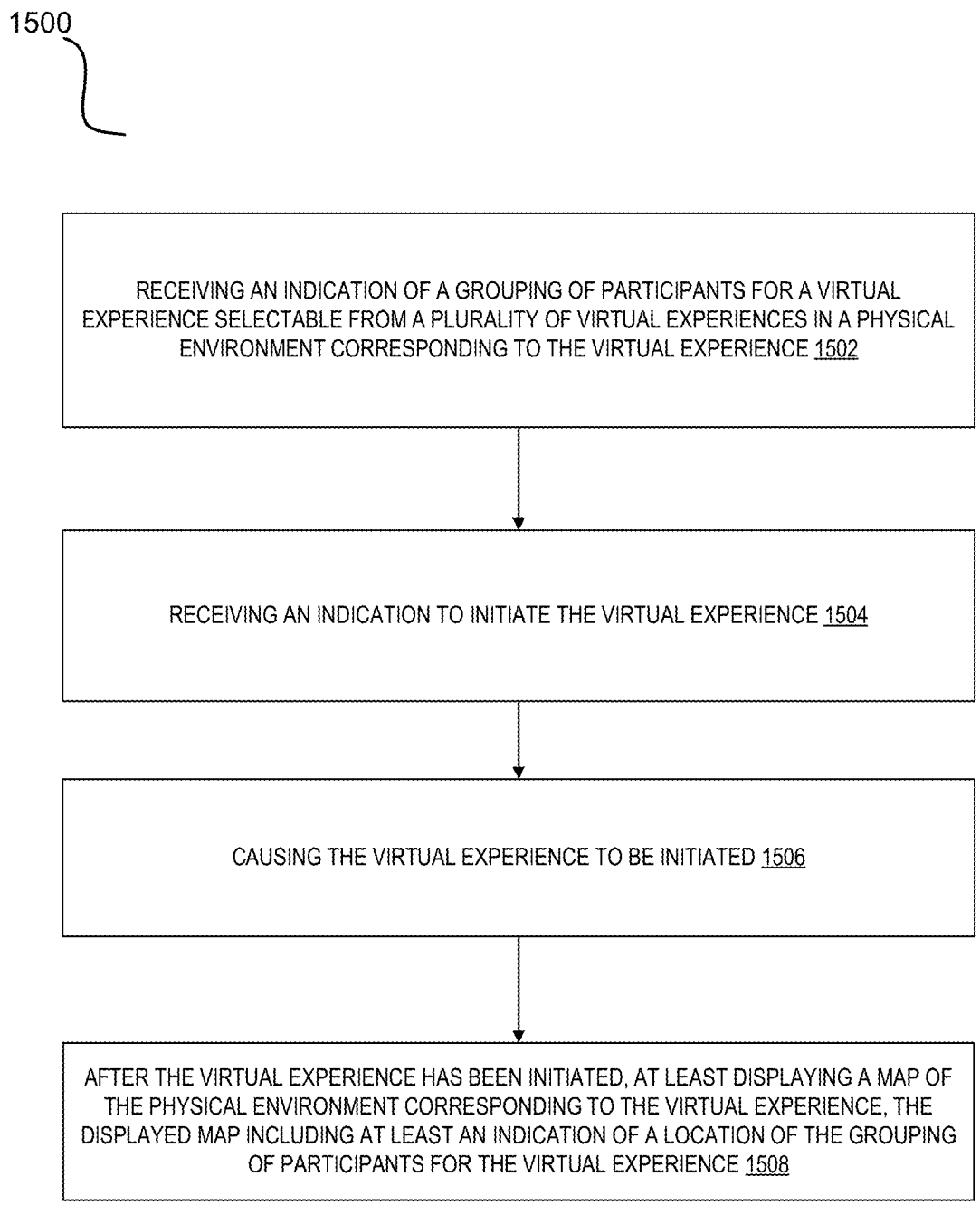
FIG. 15 is a flow diagram illustrating operations of a method for using a virtual experience pillar in a virtual experience according to some embodiments.

FIG. 15 is a flow diagram illustrating operations 1500 of a method for a guide-assisted virtual experience according to some embodiments. Some or all of the operations 1500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 1500 are performed by server computer(s), player computer(s), and possibly other components of the other figures.

The operations 1500 include, at block 1502, receiving an indication of a grouping of participants for a virtual experience selectable from a plurality of virtual experiences in a physical environment corresponding to the virtual experience. As illustrated in FIGS. 6A-6D, for example, a guide can create a grouping of participants using a guide application by assigning queued participants to particular teams based in part on a particular virtual experience for which each participant is awaiting entry.

In some embodiments, the indication of the grouping of participants for the virtual experience includes one or more of: an edit of what participants are a part of the grouping of participants for the virtual experience; an assignment of an avatar to a participant of the grouping of participants for the virtual experience, where the assigned avatar will represent the participant in the virtual experience; and an indication of the virtual experience for the grouping of participants to utilize. As illustrated in FIGS. 6-9, for example, a guide can configure various aspects of a team assigned to the guide before launching the team into an experience.

In some embodiments, an indication of the physical equipment to be used by each participant of the grouping of participants during the virtual experience is received. For example, as shown in FIGS. 8A and 8B, a guide can provide input assigning available rigs from a rig library to group participants. As further shown in FIGS. 8A and 8B, in some embodiments, a guide application displays a status of the physical equipment (e.g., using different color representations or other graphical indications of battery status, maintenance status, an identifier of the physical equipment, size information, or other health information associated with each rig).

In some embodiments, a request is received to troubleshoot an issue; an indication of an action to take to troubleshoot the issue is displayed; a selection of an action to take to troubleshoot the issue is received; and the action to be taken to troubleshoot the issue to occur is caused. For example, as illustrated in the example interfaces shown in FIGS. 10A-10C, a guide can select a troubleshooting interface element if one or more participants are experiencing technical issues and the guide application can cause automated actions to be performed to attempt to remediate the issues. In some embodiments, the issue is at least one of an issue with an HMD, an issue with audio, an issue with handheld equipment provided to the participant, and an issue with a sensor reading of the participant. In some embodiments, the action to be taken to troubleshoot the issue is one or more of: causing a rest of a device used by the participant; and alerting a user (e.g., the guide) to change the physical equipment. In some embodiments, the action to be taken to troubleshoot the issue is determined by a remote server that is receiving status information corresponding to the physical equipment. In some embodiments, the action to be taken to troubleshoot the issue is a pre-programmed routine that is associated with the selected issue.

In some embodiments, a selection of a language of a participant is received, where the virtual experience uses that language for the participant. In some embodiments, a group of participants can be associated with a plurality of different languages.

The operations 1500 further include, at block 1504, receiving an indication to initiate the virtual experience. As shown in FIG. 9, for example, a guide can select a "launch team" interface element of a guide application once all pre-launch configurations are complete to initiate a virtual experience for a participant team to which the guide is assigned. In some embodiments, prior to receiving an indication to initiate the virtual experience, an indication of active groupings of participants in the virtual experience is displayed. In some embodiments, prior to receiving an indication to initiate the virtual experience, an indication of queued participants waiting to be included in a grouping of participants is displayed.

In some embodiments, a remote server determines a physical environment (e.g., a stage) that corresponds to the virtual experience. For example, a remote server 150 may determine a physical environment for a virtual experience based on information provided by a guide using the guide application, based on a default mapping of virtual experiences to physical environments, or based on other information. In some embodiments, a physical environment that corresponds to the virtual experience is determined using information from the remote server.

The operations 1500 further include, at block 1506, causing the virtual experience to be initiated. For example, in response to the guide providing the input to initialize a virtual experience, a central server can cause the virtual experience to be initiated at the rigs worn by each of the team participants. In some embodiment, after the virtual experience has been initiated, a status of the equipment of the grouping of participants is displayed.

In some embodiments, an alert generated from equipment of a participant is received, where the issue regards one or more of health of the participant and status of the equipment. For example, a guide may receive a notification in the guide application alerting the guide to one or more issues involving group participants or involving equipment worn by the group participants during the virtual experience. In some embodiments, the health of a participant is determined using one or more sensors of the equipment (e.g., to monitor a participant's heart rate, balance, or the like).

In some embodiments, a guide application is used to display a view as seen by a participant of the grouping of participants of the virtual experience. For example, a guide may use a guide application to cause display of the view seen by one or more participants in their respective HMDs so that the guide can address possible issues or to otherwise enhance the participants' experience. In some embodiments, a guide may similarly use a guide application to request to listen to audio from at least one participant of the grouping of participants.

The operations 1500 further include, at block 1508, after the virtual experience has been initiated, at least displaying a map of the physical environment corresponding to the virtual experience, the displayed map including at least an indication of a location of the grouping of participants for the virtual experience. For example, as shown in FIG. 11, a guide application displays a map of the physical environment corresponding to the virtual experience, where the displayed map can include at least an indication of the participant group, as well as other participant groups that may be within the same physical environment and engaged in a same virtual experience. In some embodiments, the displayed map includes an indication of timing for the grouping of participants for the virtual experience in the location (e.g., to indicate whether the participant grouping is proceeding through the virtual experience at a desired pace). In some embodiments, the indication of timing is an indication of an amount of time remaining at the location (or an amount of time remaining within a particular area of a virtual experience). In some embodiments, the indication of timing is an indication that the grouping of participants is to remain at the location as another grouping of participants is occupying a subsequent physical location in the virtual experience.

In some embodiments, an interaction with one or more participants as an avatar in the virtual experience is caused. For example, the guide application may enable a guide to interact with one or more group participants by communicating to the participants verbally (e.g., via audio equipment in the participants' HMDs), to physically interact with participants in the virtual environment (e.g., by providing an item to a participant that corresponds to an item in the virtual experience), or by otherwise initiating physical contact in the physical environment with one or more group participants.

In some embodiments, initiating a conversation between a participant and an avatar representing the guide comprises: receiving a selection of a phrase for the avatar to say; and causing the selected phrase to be uttered by the avatar in the virtual experience. For example, a guide application may provide a guide with a conversational tree of utterance options that enable a guide to easily interact with a wide variety of questions posed by group participants. In some embodiments, initiating a conversation between a participant and the avatar representing the guide comprises: receiving a phrase for the avatar to say (e.g., either by the guide speaking the phrase or typing the phrase); and causing the selected phrase to be uttered by the avatar in the virtual experience.

Figure 16:
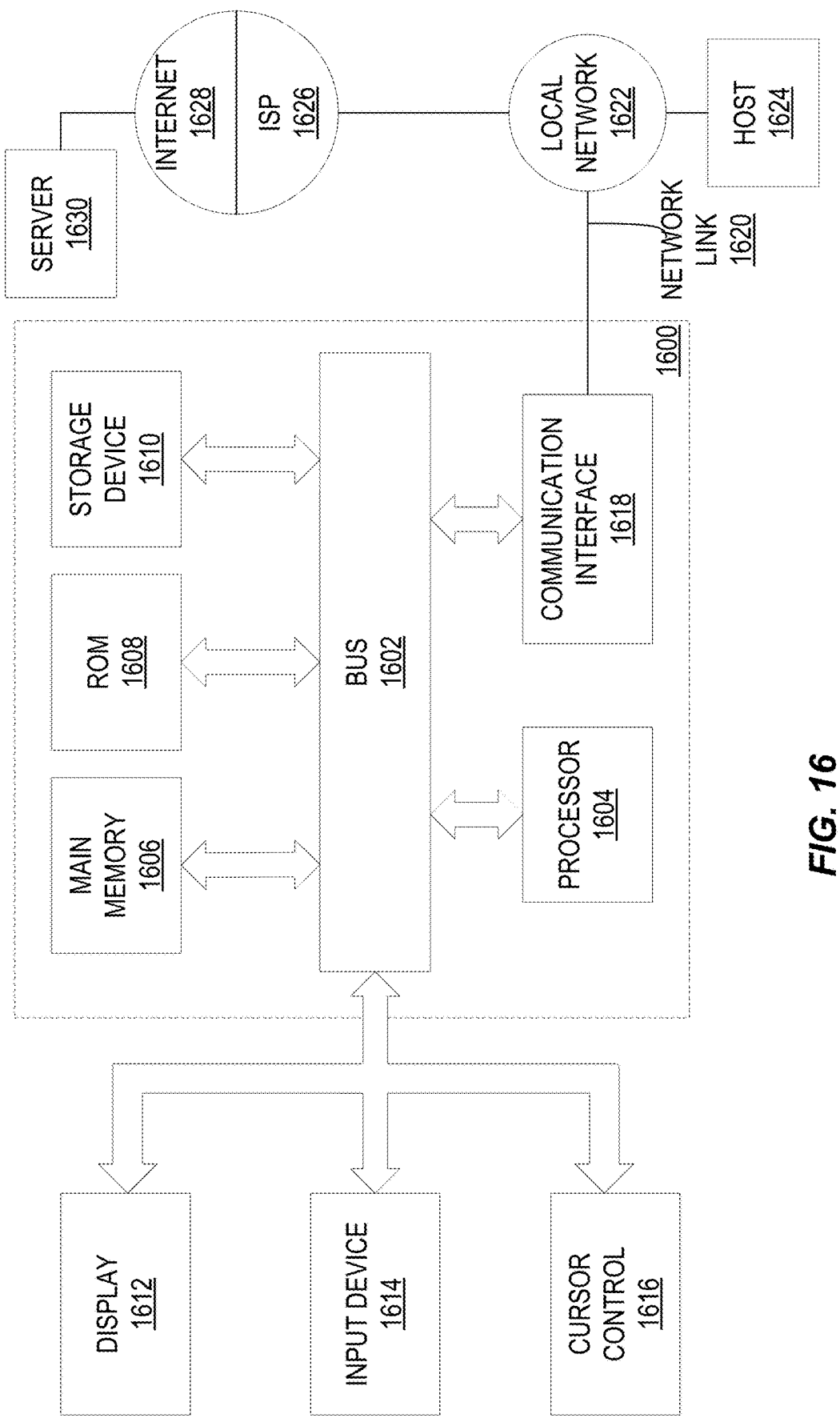
FIG. 16 is a block diagram illustrating an example computer system that may be used in some embodiments.

In some embodiments, a system that implements a portion or all of the techniques for displaying and using virtual pillars in virtual experience environments as described herein may include a general-purpose computer system that includes or is configured to access one or more computer-accessible media, such as computer system 1600 illustrated in FIG. 16. In the illustrated embodiment, computer system 1600 includes one or more processors 1610 coupled to a system memory 1620 via an input/output (I/O) interface 1630. Computer system 1600 further includes a network interface 1640 coupled to I/O interface 1630. While FIG. 16 shows computer system 1600 as a single computing device, in various embodiments a computer system 1600 may include one computing device or any number of computing devices configured to work together as a single computer system 1600.

In various embodiments, computer system 1600 may be a uniprocessor system including one processor 1610, or a multiprocessor system including several processors 1610 (e.g., two, four, eight, or another suitable number). Processors 1610 may be any suitable processors capable of executing instructions. For example, in various embodiments, processors 1610 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1610 may commonly, but not necessarily, implement the same ISA.

System memory 1620 may store instructions and data accessible by processor(s) 1610. In various embodiments, system memory 1620 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1620 as code 1625 and data 1626.

In one embodiment, I/O interface 1630 may be configured to coordinate I/O traffic between processor 1610, system memory 1620, and any peripheral devices in the device, including network interface 1640 or other peripheral interfaces. In some embodiments, I/O interface 1630 may perform any necessary protocol, timing or other data transformations to convert data signals from one component (e.g., system memory 1620) into a format suitable for use by another component (e.g., processor 1610). In some embodiments, I/O interface 1630 may include support for devices attached through various types of peripheral buses, such as a variant of the Peripheral Component Interconnect (PCI) bus standard or the Universal Serial Bus (USB) standard, for example. In some embodiments, the function of I/O interface 1630 may be split into two or more separate components, such as a north bridge and a south bridge, for example. Also, in some embodiments some or all of the functionality of I/O interface 1630, such as an interface to system memory 1620, may be incorporated directly into processor 1610.

Network interface 1640 may be configured to allow data to be exchanged between computer system 1600 and other devices 1660 attached to a network or networks 1650, such as other computer systems or devices as illustrated in FIG. 1, for example. In various embodiments, network interface 1640 may support communication via any suitable wired or wireless general data networks, such as types of Ethernet network, for example. Additionally, network interface 1640 may support communication via telecommunications/telephony networks such as analog voice networks or digital fiber communications networks, via storage area networks (SANs) such as Fibre Channel SANs, or via I/O any other suitable type of network and/or protocol.

In some embodiments, system memory 1620 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1600 via I/O interface 1630. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1600 as system memory 1620 or another type of memory. Further, a computer-accessible medium may include transmission media or signals such as electrical, electromagnetic, or digital signals, conveyed via a communication medium such as a network and/or a wireless link, such as may be implemented via network interface 1640.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method for providing a guide-assisted virtual experience for a grouping of human participants in a combined virtual and physical environment, the computer-implemented method comprising:
receiving, by a processor, from a server, an indication of the grouping of participants for the virtual experience selectable from a plurality of virtual experiences in a physical environment corresponding to the virtual experience, wherein each participant of the grouping of participants has a participant computer, the participant computer configured to send location information related to a location of the respective participant within the physical environment to the server;
assigning, by a processor, a guide to the grouping of participants, the guide having as associated guide computer executing an associated guide application;
receiving, by the server, an indication to initiate the virtual experience in the physical environment corresponding to the virtual experience;
causing, by the server, the virtual experience to be initiated in the physical environment corresponding to the virtual experience; and
after the virtual experience has been initiated:
receiving, by the server, the location information related to the location of at least one participant of the grouping of participants;
transmitting, by the server, the location information related to the location of the at least one participant of the grouping of participants to the guide application associated with the guide assigned to the grouping of participants; and
causing, by the associated guide application, display of a map of the physical environment corresponding to the virtual experience, the displayed map including an indication of the location of the at least one participant of the grouping of participants within the physical environment.

2. The method of claim 1, wherein the indication of the grouping of participants for a virtual experience comprises one or more of:
an edit of what participants are a part of the grouping of participants for the virtual experience;
an assignment of an avatar to a participant of the grouping of participants for the virtual experience, wherein the assigned avatar will represent the participant in the virtual experience; and
an indication of the virtual experience for the grouping of participants to utilize.

3. The method of claim 1, further comprising:
determining, by the server, the physical environment that corresponds to the virtual experience.

4. The method of claim 1, further comprising:
determining, by the associated guide application using information from the server, the physical environment that corresponds to the virtual experience.

5. The method of claim 1, further comprising:
receiving, by at least one of the server and the associated guide application, an indication of physical equipment to be used by each participant of the grouping of participants during the virtual experience.

6. The method of claim 5, further comprising:
displaying, by the associated guide application, a status of the physical equipment.

7. The method of claim 6, wherein the status indicates one or more of an estimate of a maintenance status of the physical equipment, an identifier of the physical equipment, and a size of the physical equipment.

8. The method of claim 1, further comprising:
receiving, by the server, a request to troubleshoot an issue;
displaying, by the associated guide application, an indication of an action to take to troubleshoot the issue;
receiving, by the associated guide application, a selection of the action to take to troubleshoot the issue; and
causing, by at least one of the associated guide application and the server, the action to be taken to troubleshoot the issue to occur.

9. The method of claim 8, wherein the issue is at least one of an issue with a head-mounted display, an issue with audio, an issue with handheld equipment provided to the participant, and an issue with a sensor reading of the participant.

10. The method of claim 8, wherein the action to be taken to troubleshoot the issue is one or more of:
causing a reset of a device used by the participant; and
alerting a user to change the physical equipment.

11. The method of claim 8, wherein the action to be taken to troubleshoot the issue is determined the server that is receiving status information corresponding to the physical equipment.

12. The method of claim 8, wherein the action to be taken to troubleshoot the issue is a preprogrammed routine that is associated with the selected issue.

13. The method of claim 1, wherein the displayed map includes an indication of a location of other groupings of participants within the physical environment.

14. The method of claim 1, wherein the displayed map includes an indication of timing for the grouping of participants for the virtual experience in the location.

15. The method of claim 14, wherein the indication of timing is an indication of an amount of time remaining at the location.

16. The method of claim 14, wherein the indication of timing is an indication that the grouping of participants is to remain at the location as another grouping of participants is occupying a subsequent physical location in the physical environment.

17. The method of claim 1, further comprising:
prior to receiving an indication to initiate the virtual experience, displaying, by the associated guide application, an indication of active groupings of participants in the virtual experience.

18. The method of claim 1, further comprising:
prior to receiving an indication to initiate the virtual experience, displaying, by the associated guide application, an indication of queued participants waiting to be included in a grouping of participants.

19. The method of claim 1, further comprising:
causing, by the associated guide application, an interaction between the guide assigned to the grouping of participants and at least one participant in the virtual experience, wherein the guide is represented by an avatar in the virtual experience.

20. The method of claim 19, wherein the interaction includes one or more of:
initiating physical contact in the physical environment;

initiating the provision of a physical object to a participant that has a virtual counterpart in the virtual experience; and initiating a conversation between the participant and the avatar.

21. The method of claim 1, further comprising:

receiving, by at least one of the server and the associated guide application, a selection of a language of a participant, wherein the virtual experience is to use that language for the participant.

22. The method of claim 1, further comprising:

receiving, by the associated guide application, an alert generated from equipment of a participant of an issue regarding one or more of health of the participant and status of the equipment.

23. The method of claim 22, wherein the health of the participant is determined using one or more sensors of the equipment.

24. The method of claim 1, further comprising:

displaying, by the associated guide application, a view as seen by a participant of the grouping of participants of the virtual experience.

25. The method of claim 1, further comprising:

receiving, by at least one of the server and the associated guide application, a request to listen to audio from at least one participant of the grouping of participants.

26. The method of claim 20, wherein initiating a conversation between the participant and the avatar comprises:

receiving, by the server from the associated guide application, a selection of a phrase for the avatar to say; and causing, by the server, the selected phrase to be uttered by the avatar in the virtual experience.

27. The method of claim 20, wherein initiating a conversation between the participant and the avatar comprises:

receiving, by the server from the associated guide application, a phrase for the avatar to say; and causing, by the server, the selected phrase to be uttered by the avatar in the virtual experience.

28. The method of claim 1, further comprising:

after the virtual experience has been initiated, displaying, by the associated guide application, a status of equipment of the grouping of participants.

29. A system for providing a guide-assisted virtual experience for a grouping of human participants in a combined virtual and physical environment, the system comprising:

a server having one or more processors;

a participant computer for each participant of the grouping of participants, each participant computer having one or more processors; and a guide computer, the guide computer having one or more processors;

wherein the guide computer is configured to receive, from the server, an indication of the grouping of participants for the virtual experience selectable from a plurality of virtual experiences in a physical environment corresponding to the virtual experience;

wherein the server is configured to receive an indication to initiate the virtual experience in a physical environment corresponding to the virtual experience and to cause the virtual experiences to be initiated in the physical environment corresponding to the virtual experience;

wherein each participant computer is configured to send location information to the server, the location information related to a location of the respective participant of the grouping of participants within the physical environment;

wherein the guide application is configured to receive the location information of at least one participant of the grouping of participants from the server; and wherein the guide application is configured to display a map of the physical environment corresponding to the virtual experience, the displayed map including an indication of the location of the at least one participant of the grouping of participants within the physical environment.

30. A non-transitory computer-readable storage medium storing instructions which, when executed by one or more processors, cause performance of operations comprising:

receiving, by a processor, from a server, by an indication of a grouping of human participants for a virtual experience selectable from a plurality of virtual experiences in a physical environment corresponding to the virtual experience, wherein each participant of the grouping of participants has a participant computer, the participant computer configured to send location information related to a location of the participant within the physical environment to the server;

receiving, by the server, an indication to initiate the virtual experience in the physical environment corresponding to the virtual experience;

causing, by the server, the virtual experience to be initiated in the physical environment corresponding to the virtual experience; and after the virtual experience has been initiated:

receiving, by the server, the location information related to the location of at least one participant of the grouping of participants;

transmitting, by the server, the location information related to the location of the at least one participant of the grouping of participants to a guide application being executed on a guide computer; and displaying, by the guide application, a map of the physical environment corresponding to the virtual experience, the displayed map including an indication of the location of the at least one participant of the grouping of participants within the physical environment.

* * * * *